US008782363B2

(12) United States Patent
Shitomi

(10) Patent No.: US 8,782,363 B2
(45) Date of Patent: Jul. 15, 2014

(54) INFORMATION PROCESSING SYSTEM AND METHOD FOR CONTROLLING THE SAME

(75) Inventor: Hidehisa Shitomi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 13/201,091

(22) PCT Filed: Jul. 22, 2011

(86) PCT No.: PCT/JP2011/004133
§ 371 (c)(1),
(2), (4) Date: Aug. 11, 2011

(87) PCT Pub. No.: WO2013/014694
PCT Pub. Date: Jan. 31, 2013

(65) Prior Publication Data
US 2013/0024634 A1 Jan. 24, 2013

(51) Int. Cl.
*G06F 12/00* (2006.01)
(52) U.S. Cl.
USPC .......................................................... 711/162
(58) Field of Classification Search
None
See application file for complete search history.

(56) References Cited

U.S. PATENT DOCUMENTS

| 2004/0153606 | A1 | 8/2004 | Schott | |
|---|---|---|---|---|
| 2004/0210724 | A1* | 10/2004 | Koning et al. | 711/153 |
| 2008/0155214 | A1* | 6/2008 | Shitomi | 711/162 |
| 2009/0300079 | A1* | 12/2009 | Shitomi | 707/204 |
| 2010/0042797 | A1* | 2/2010 | Asano et al. | 711/165 |
| 2010/0293412 | A1* | 11/2010 | Sakaguchi et al. | 714/17 |

FOREIGN PATENT DOCUMENTS

| JP | 2009-289252 | 12/2009 |
|---|---|---|
| WO | WO-2004/066278 A2 | 8/2004 |

OTHER PUBLICATIONS

PCT International Search Report and Written Opinion on application PCT/JP2011/004133 mailed Apr. 12, 2012; 12 pages.
Wei Liu et al: "An effective file migratio algorithm in cluster file systems," Proceedings 2000. International Workshop on Parallel Processing IEEE Comput. Soc, Los Alamitos, CA, USA, Aug. 21, 2000; pp. 329-335.

* cited by examiner

*Primary Examiner* — Matthew Bradley
*Assistant Examiner* — Daniel Tsui
(74) *Attorney, Agent, or Firm* — Foley & Lardner LLP

(57) ABSTRACT

The present invention concerns one of the plurality of first storage apparatuses, prior to a file migration to the second storage apparatus, notifies to the second storage apparatus of file migration information being information relating to the file migration, the second storage apparatus calculates an increment of a load on the second storage apparatus that is generated by the file migration based on information written in the file migration information, the second storage apparatus determines whether the file migration is allowable based on a current load on the second storage apparatus itself and the increment, the second storage apparatus notifies the determination result to the one of the plurality of first storage apparatuses that has notified the file migration information, and the one of the plurality of first storage apparatuses determines whether to migrate the file to the second storage apparatus based on the determination result.

12 Claims, 35 Drawing Sheets

Fig. 13

REPLICATION INFORMATION MANAGEMENT TABLE 331

3311 — REPLICATION DESTINATION : host-001, 201.123.45.6
3312 — STUBBING THRESHOLD : 200GB

Fig. 14

FILE ACCESS LOG 332

| ACCESS DATE AND TIME 3321 | FILE NAME 3322 | USER ID 3323 |
|---|---|---|
| 2011/3/16 12:00:00 | /home/user01/a.txt | user01 |
| 2011/3/16 12:10:00 | /home/user02/b.txt | user02 |
| 2011/3/16 12:20:00 | /home/user01/a.txt | user03 |
| : | : | : |

Fig. 15

FILE MIGRATION POLICY TABLE 333

| TARGET FILE | WINDOW |
|---|---|
| ENTITY OF SYNCHRONIZATION NECESSITY FILE | 10pm~6am |
| METADATA OF SYNCHRONIZATION NECESSITY FILE | 10pm~6am |

Fig. 19

FILE MIGRATION MANAGEMENT TABLE 110

| # | COR | JOB | WINDOW | TOTAL TRANSFER AMOUNT | EFFECTIVE PERFORMANCE | READ/WRITE | REMAINING CACHE | RESULT |
|---|-----|-----|--------|----------------------|----------------------|------------|-----------------|--------|
| 1 | 001 | 1 | 10pm-6am | 10GB | 100Mbps | W | 1TB | ALLOWED |
| 2 | 002 | 1 | 11pm-8pm | 50GB | 100Mbps | W | 2TB | STANDBY |
| 3 | 003 | 1 | 12am-5am | 20GB | 10Mbps | W | 100GB | STANDBY |
| 4 | 004 | 1 | 1am-8am | 100GB | 1Gbps | W | 10GB | STANDBY |
| 5 | 005 | 1 | 2am-8am | 10GB | 100Mbps | W | 1TB | STANDBY |
| 6 | 001 | 2 | - | - | | R | | ALLOWED |

FILE SYSTEM STRUCTURE 2200

| PARENT DIRECTORY | inode NUMBER | inode NUMBER OF CHILD DIRECTORY |
|---|---|---|
| / | 2 | 10 |
| home | 10 | 15 |
| user-01 | 15 | 100 |
| a.txt | 100 | |

STUBBING CANDIDATE SELECTION PROCESSING S2900

INFORMATION PROCESSING SYSTEM AND METHOD FOR CONTROLLING THE SAME

TECHNICAL FIELD

The present invention relates to an information processing system and a method for controlling the information processing system.

BACKGROUND ART

Recently, there has been developed a technology related to an information processing system in which storage systems are respectively structured in bases and the like of a company and files respectively generated in the storage systems of the bases are aggregated in a data center and storedtherein.

PTL 1 discloses a technology that, in an information system including a first storage site and a second storage site which is located at a remote site, the first storage site includes a first storage system which provides a higher hierarchy of the storage and a second storage system which provides a lower hierarchy of the storage, the second storage site includes third and fourth storage systems, which respectively receive remote replication from the first and second storage systems and, when a file is migrated, a stubbed file which displays the storage location of the migrated file in the second storage system is saved at a position of the migration source file while, when the copies of the migrated file and the stubbed file are replicated to the fourth and third storage systems respectively, information for linking the copy of the stubbed file in the third storage system to the copy of the migrated file in the fourth storage system is transmitted to the second storage site.

CITATION LIST

Patent Literature

PTL 1: Japanese Patent Application Laid-Open Publication No. 2009-289252

SUMMARY OF INVENTION

Technical Problem

In such a case, the load on the storage system of the data center increases along with such as the increase in the number of bases and the amount of data of the handled files, when the scale of the information processing system increases.

Therefore, there is a demand for technology for proprietarily controlling the load on the data center and improving the reliability of the entire information processing system.

The present invention has been made in view of the above-mentioned background and a purposes thereof is to improve the reliability of the information processing system.

Solution to Problem

One aspect of the present invention for achieving the above-mentioned purpose is an information processing system comprising: a plurality of first storage apparatuses that receive data I/O requests in file units sent from an information processing apparatus, and perform data I/O; and a second storage apparatus that is communicatively coupled to each of the plurality of first storage apparatuses, wherein one of the plurality of first storage apparatuses, prior to a file migration to the second storage apparatus, notifies to the second storage apparatus of file migration information being information relating to the file migration, the second storage apparatus calculates an increment of a load on the second storage apparatus that is generated by the file migration based on information written in the file migration information, the second storage apparatus determines whether the file migration is allowable based on a current load on the second storage apparatus itself and the increment, the second storage apparatus notifies the determination result to the one of the plurality of first storage apparatuses that has notified the file migration information, and the one of the plurality of first storage apparatuses determines whether to migrate the file to the second storage apparatus based on the determination result.

The other problems disclosed by the present invention and the solutions thereof are made clear by the description of embodiments and the figures of the present invention.

Advantageous Effects of Invention

According to the present invention, the reliability of the information processing system can be improved.

BRIEF DESCRIPTION OF DRAWINGS

FIG. 12 is a diagram showing main functions of a first server apparatus 3a and main information (data) managed in the first server apparatus 3a.

FIG. 13 is an example of a replication information management table 331.

FIG. 14 is an example of a file access log 332.

FIG. 15 is an example of a file migration policy table 333.

FIG. 19 is an example of a file migration management table 110.

DESCRIPTION OF EMBODIMENTS

Hereinafter, description of the embodiments of the present invention is given with reference to the figures.

Figure 1:
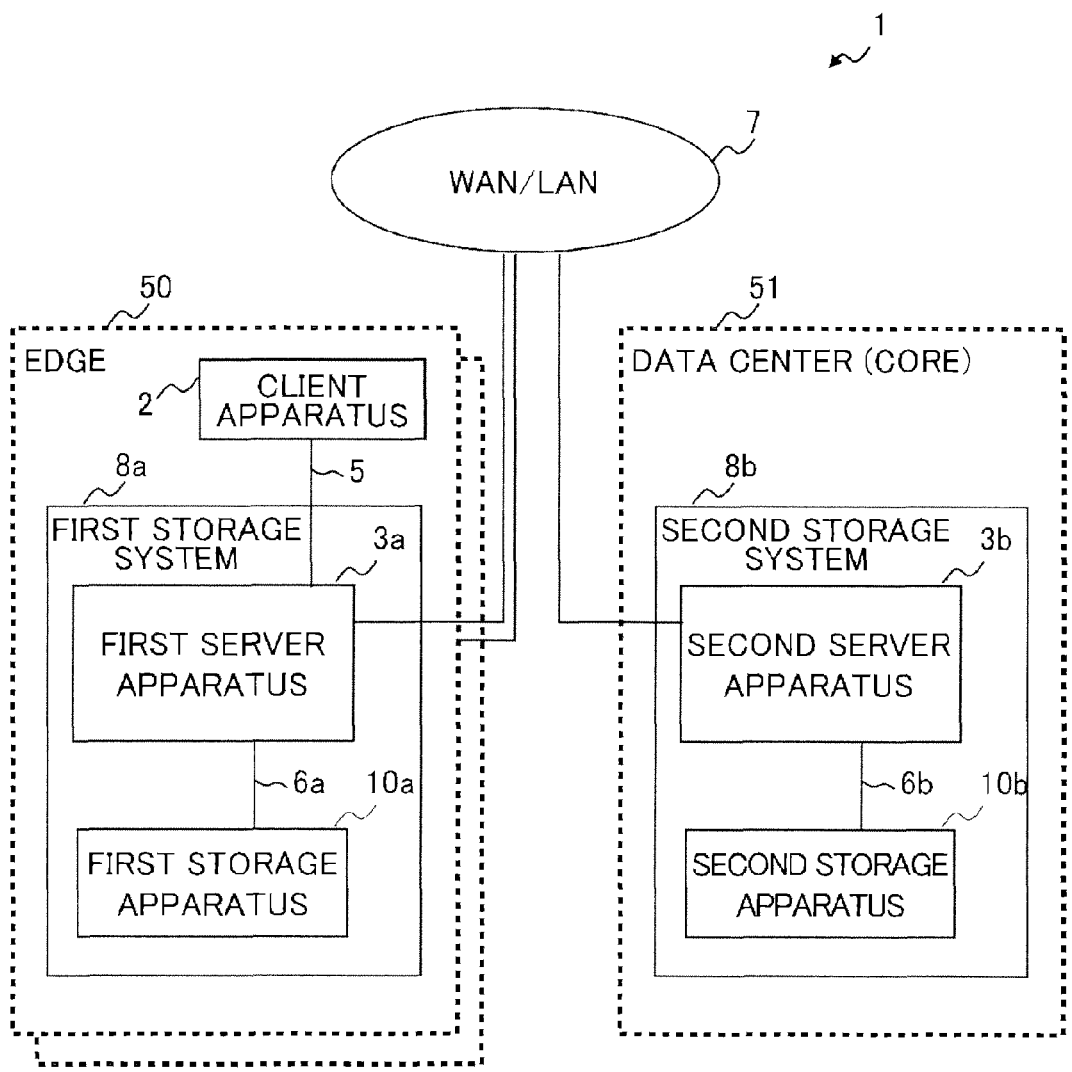
FIG. 1 is a diagram showing the general configuration of an information processing system 1.

A general configuration of an information processing system 1 related to the present embodiment is shown in FIG. 1. The information processing system 1 is configured of a plurality of systems (hereinafter also referred to as Edges 50) which are respectively structured in a plurality of bases such as branch offices of a company, business establishments and the like and a system which is structured at a base (hereinafter also referred to as Core 51) such as a data center for performing operation management of the respective Edges 50, provision of application services and provision of the cloud service to the respective Edges 50 and other operations are communicatively coupled via a communication network 7 such as WAN (Wide Area Network) and LAN (Local Area Network).

The respective Edges 50 may be systems installed at the respective bases of the same company and may also be systems installed at the respective bases of different companies.

A first server apparatus 3a, a first storage apparatus 10a, and a client device 2 are installed in each of the Edges 50. Furthermore, a first storage system 8a is configured to include the first server apparatus 3a and the first storage apparatus 10a. Obviously, the storage system 8a may be configured to include two apparatuses which are the storage apparatus 10a and the server apparatus 3a, and may also be configured as a single storage apparatus having the functions of both the storage apparatus 10a and the server apparatus 3a.

Furthermore, a second server apparatus 3b and a second storage apparatus 10b are installed in the Core 51. Subsequently, a second storage system 8b is configured including the second server apparatus 3b and the second storage apparatus 10b. The storage system 8b may be configured to include two apparatuses which are the storage apparatus 10b and the server apparatus 3b, and may also be configured as a single storage apparatus including the functions of both the storage apparatus 10b and the server apparatus 3b.

It should be noted that the location of each of the components in the information processing system 1 is not necessarily limited to what is shown in FIG. 1. Furthermore, in the explanation below, for simplifying and rationalizing the explanation, the first server apparatus 3a and the second server apparatus 3b are also collectively referred to as server apparatuses 3. Furthermore, for example, the first storage apparatus 10a and the second storage apparatus 10b are also collectively referred to as storage apparatuses 10. The other components are also collectively referred to in a similar manner as needed.

In each of the Edges 50, a client device 2, the first server apparatus 3a, and the first storage apparatus 10a perform information processing every day. Subsequently, along with the performance of information processing, new data such as files are generated and accumulated in the first storage apparatus 10a every day.

While the details are explained later, for example, in a specified time period such as at night after business hours of each of the Edges 50, these data are migrated to the second storage system 8b in the Core 51 in accordance with a policy (a file migration policy) stored in the first server apparatus 3a of each of the Edges 50.

At the time of migration, the first storage apparatus 10a transmits (replicates) a replication of the migration target data from the first storage apparatus 10a to the second storage apparatus 10b, stores the metadata such as the storage location of those data in the second storage apparatus 10b as a stub file in the first storage apparatus 10a, and also deletes the entity of the data migrated to the second storage apparatus 10b from the first storage apparatus 10a (stubbing).

The information processing system 1 by performing the above-mentioned migration, allows various types of management operations, such as data backup that were respectively performed in each of the Edges 50, can be consolidated in the Core 51, and thus various costs such as the above-mentioned backup operation cost, the software cost, and the equipment cost can be reduced at each of the Edges 50.

The second storage system 8b in the Core 51 stores the data respectively transmitted from the respective Edges 50 in the second storage apparatus 10b within the respective specified time period.

In the information processing system 1 related to the present embodiment, before migrating these data to the second storage system 8b, the first storage system 8a of each of the Edges 50 transmits file migration information that has written therein information related to file migration such as information for specifying the total amount of data to be transmitted and the deadline for migration to the second storage system 8b.

Subsequently, the second storage system 8b adjusts the timing for data migration from each of the Edges 50 based on such as file migration information transmitted from each of the Edges 50 and the load on the Core 51 at the current point of time. The second storage system 8*b* repeatedly performs this data migration timing adjustment at a specified timing.

As a result of the above-mentioned timing adjustment, the first storage system 8*a* of the Edge 50 whose data migration is determined allowable starts to transmit the data to the second storage system 8*b*. Subsequently, the second storage system 8*b* receives the data transmitted from this first storage system 8*a* and stores the data in the second storage apparatus 10*b*.

Meanwhile, the first storage system 8*a* in the Edge 50 whose data migration is determined to be at hold does not start data migration and waits for the result of the next adjustment to be transmitted from the second storage system 8*b*.

Furthermore, the first storage system 8*a* for which data migration is not determined allowable in spite of waiting for data migration and which cannot perform data migration within the time period specified by the file migration information suspends the data migration to the second storage system 8*b*.

In this case, this first storage system 8*a*, for example, may also transmit the file migration information to the second storage system 8*b* again after a specified time period (for example, twenty-four hours later) and performs data migration to the second storage system 8*b* after data migration is determined allowable. This first storage system 8*a* may perform data migration to another storage system different from the second storage system 8*b* (for example, a third storage system 8*c* explained later).

While the details are explained later, the information processing system 1 performs the above-mentioned control to allow migration processing to be performed while taking into consideration the information processing capability of and the load on the Core 51. Subsequently, for example, by scheduling the data migration from each of the Edges 50 so as not to exceed the information processing capability of the Core 51, the occurrence of failures and troubles in the Core 51 can be prevented and the reliability of the information processing system 1 can be improved. In this way, the maintainability of the user data of each of the Edges 50 can be improved.

Hereinafter, each of the components in the information processing system 1 is sequentially explained.

The first server apparatus 3*a* is, for example, a file storage apparatus including a file system which provides the function of data management in units of files to the client device 2.

The first server apparatus 3*a* may also be realized as a virtual machine by a virtualization control mechanism (a host OS type, a hypervisor type, and the like).

The second server apparatus 3*b* is, for example, an apparatus (an archive apparatus) functioning as a data library (an archive) for the first storage apparatus 10*a* in the Edge 50. The second server apparatus 3*b* is implemented, for example, by using resources provided by the cloud service. The second server apparatus 3*b* may also be implemented as a virtual machine by a virtualization control mechanism (a host OS type, a hypervisor type, and the like).

The client device 2 and the first server apparatus 3*a* are communicatively coupled via a first communication network 5. Furthermore, the first server apparatus 3*a* and the first storage apparatus 10*a* are communicatively coupled via a first storage network 6*a*.

The first server apparatus 3*a* and the second server apparatus 3*b* are communicatively coupled via a second communication network 7. Furthermore, the second server apparatus 3*b* and the second storage apparatus 10*b* are communicatively coupled via a second storage network 6*b*.

The first communication network 5 and the second communication network 7 are, for example, LAN (Local Area Network), WAN (Wide Area Network), the Internet, a public communication network, an exclusive line, and the like.

The first storage network 6*a* and the second storage network 6*b* are, for example, LAN, WAN, SAN (Storage Area Network), the Internet, a public telecommunication network, an exclusive line, and the like.

The communication performed via the first communication network 5, the second communication network 7, the first storage network 6*a*, and the second storage network 6*b* is performed in accordance with protocols, for example, TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The client device 2 is an information processing apparatus (a computer) which utilizes a storage area provided by the first storage apparatus 10*a* via the first server apparatus 3*a*. The client device 2 is, for example, a personal computer, an office computer, a notebook computer, a tablet mobile terminal, and the like. Furthermore, an Operating System, applications, and the like implemented by a software module (a file system, a kernel, a driver, and the like) function in the client device 2.

The client device 2 transmits read requests and write requests to the first server apparatus 3*a* for reading and writing the files required for implementing the applications from and to the first storage apparatus 10*a*.

Figure 2:
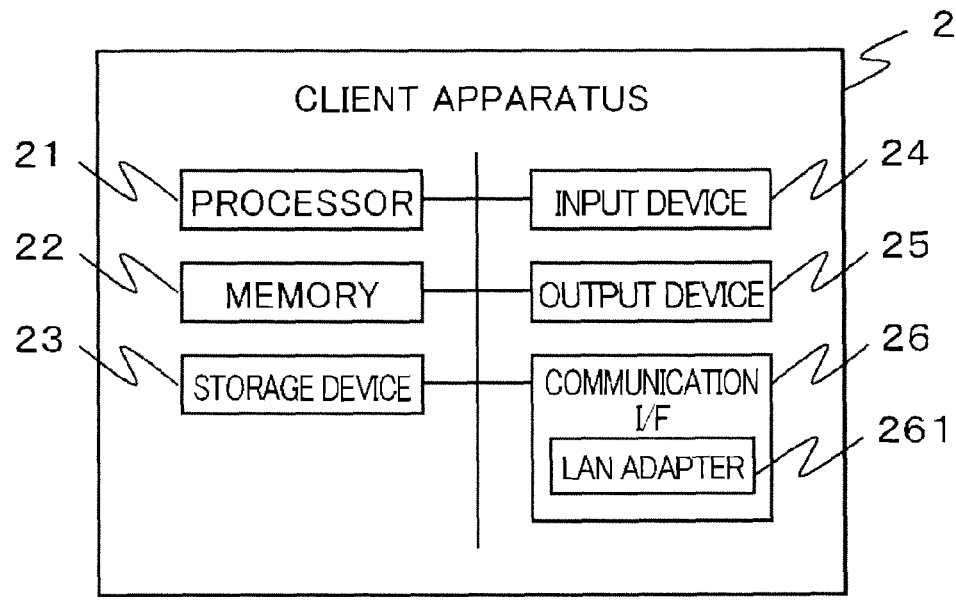
FIG. 2 is a diagram showing the hardware configuration of a client device 2.

The hardware configuration of the client device 2 is shown in FIG. 2. The client device 2 includes a processor 21, a volatile or non-volatile memory 22 (a RAM (Random Access Memory), a ROM (Read Only Memory), an NVRAM (Non Volatile RAM), and the like), a storage device 23 (an HDD (Hard Disk Drive), a semiconductor memory device (an SSD (Solid State Drive) and others)), an input device 24 (a keyboard, a mouse, a touch screen, and the like), an output device 25 (an LCD monitor, a printer, and the like), and a communication interface (also referred to as a communication I/F 26) such as an NIC (an Network Interface Card) (hereinafter also referred to as a LAN adapter 261).

The first server apparatus 3*a* is an information processing apparatus which provides information processing service to the client device 2 by utilizing the storage area provided by the first storage apparatus 10*a* as a data storage location. The first server apparatus 3*a* is configured of computers such as a personal computer, a mainframe, an office computer, and the like, for example.

When accessing the storage area provided by the first storage apparatus 10*a*, in accordance with read requests and write requests transmitted from the client device 2, the first server apparatus 3*a* transmits data frames (hereinafter abbreviated to frames) including I/O requests (data write requests, data read requests, and the like) to the first storage apparatus 10*a* via the first storage network 6*a*. It should be noted that the above-mentioned frames are Fibre Channel frames (FC frames (FC: Fibre Channel)), for example.

The second server apparatus 3*b* is an information processing apparatus which provides the information processing service by utilizing the storage area provided by the second storage apparatus 10*b*. The second server apparatus 3*b* is configured by using a personal computer, a mainframe, an office computer, and the like. When accessing the storage area provided by the second storage apparatus 10*b*, the second server apparatus 3*b* transmits frames including I/O requests to the second storage apparatus 10*b* via the second storage network 6*b*.

Figure 3:
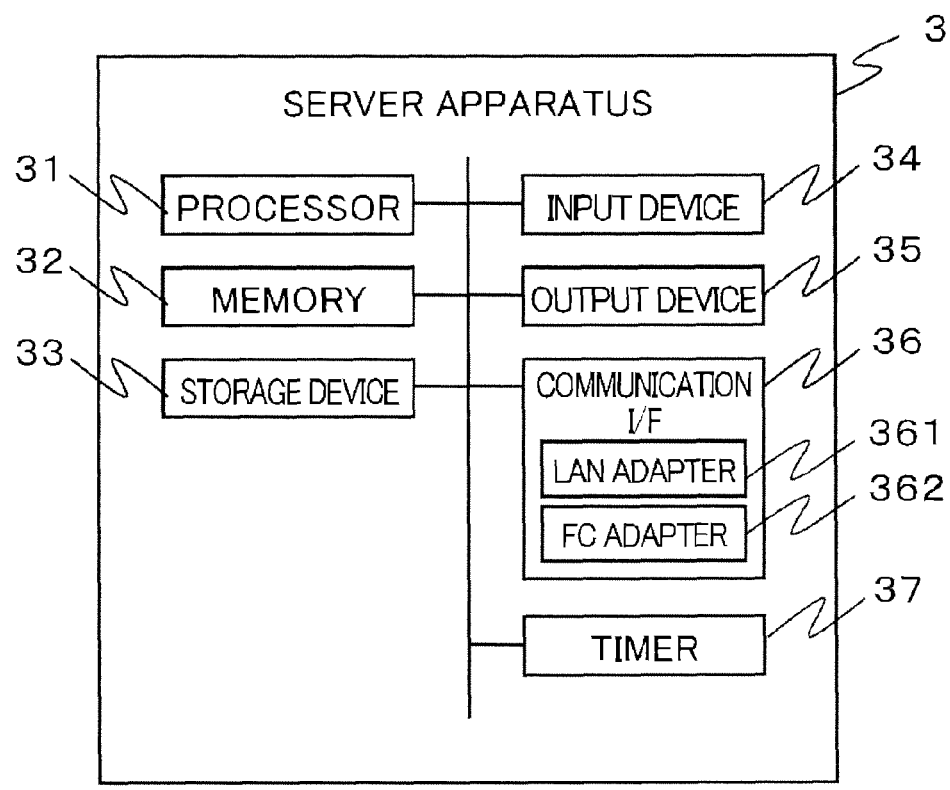
FIG. 3 is a diagram showing the hardware configuration of a server apparatus 3.

Next, the hardware configuration of the server apparatus 3 is shown in FIG. 3.

The server apparatus 3 includes a processor 31, a volatile or non-volatile memory 32 (a RAM, a ROM, an NVRAM, and the like), a storage device 33 (an HDD, a semiconductor storage device, and the like), an input device 34 (a keyboard, a mouse, and the like), an output device 35 (an LCD monitor, a printer, and the like), a communication interface (also referred to as a communication IT 36) (an NIC (hereinafter also referred to as a LAN adapter 361) and an HBA (hereinafter also referred to as an FC adapter 362), and the like), and a timer 37 configured by using a timer circuit, an RTC, and the like.

Figure 4:
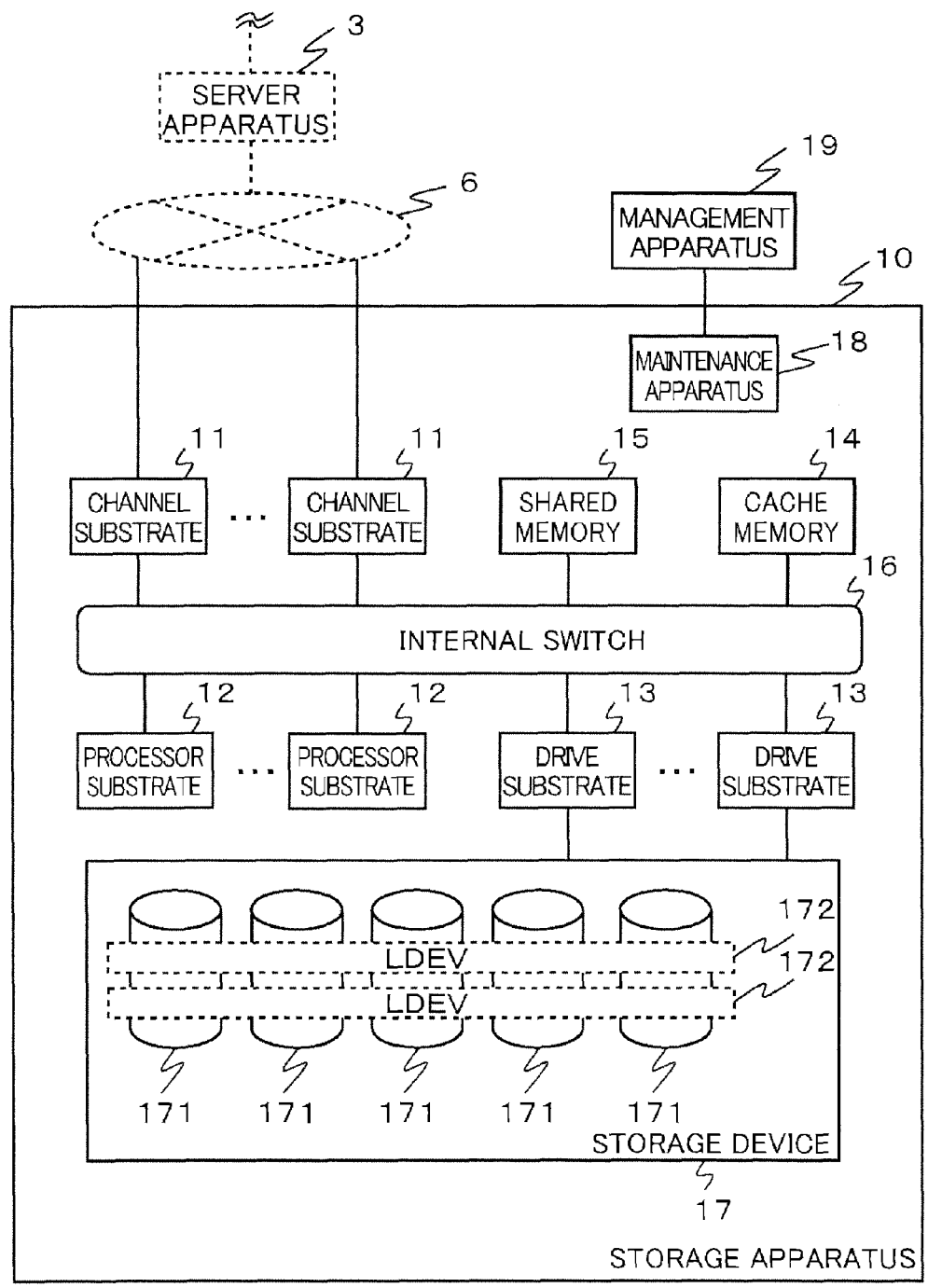
FIG. 4 is a diagram showing the hardware configuration of a storage apparatus 10.

Next, the hardware configuration of the storage apparatus 10 (the first storage apparatus 10*a*, the second storage apparatus 10*b*) is shown in FIG. 4. The storage apparatus 10 is a disk array apparatus, for example. The storage apparatus 10 receives I/O requests transmitted from the server apparatus 3 (the first server apparatus 3*a* and the second server apparatus 3*b*), accesses the storage media in accordance with the received I/O requests, and transmits data or responses to the server apparatus 3.

As shown in FIG. 4, the storage apparatus 10 includes one or more channel substrates 11, one or more processor substrates 12 (Micro Processors), one or more drive substrates 13, a Cache Memory 14, a Shared Memory 15, an internal switch 16, a storage device 17, and a maintenance apparatus 18 (SVP: SerVice Processor). The channel substrate 11, the processor substrate 12, the drive substrate 13, the Cache Memory 14, and the Shared Memory 15 are communicatively coupled to one another via the internal switch 16.

The channel substrate 11 receives frames transmitted from the server apparatus 3 and transmits the frames including responses (for example, read data, read completion reports, and write completion reports) of the processing (data I/O) related to the I/O requests included in the received frames to the server apparatus 3.

In response to the above-mentioned I/O requests included in frames received by the channel substrate 11, the processor substrate 12 performs processing related to data transfer (high-speed, large-capacity data transfer by using DMA (Direct Memory Access) and the like) performed among the channel substrate 11, the drive substrate 13, and the Cache Memory 14. The processor substrate 12 performs transfer (delivery) of data between the channel substrate 11 and the drive substrate 13 (data which is read from the storage device 17 and data to be written to the storage device 17) performed via the Cache Memory 14, staging of data which is stored in the Cache Memory 14 (reading data from the storage device 17), and destaging (writing data to the storage device 17) and the like.

The Cache Memory 14 is configured by using a RAM (Random Access Memory) capable of high-speed access. The data to be written to the storage device 17 (hereinafter also referred to as write data), the data read from the storage device 17 (hereinafter also referred to as read data), and the like are stored in the Cache Memory 14. Various types of information used for controlling the storage apparatus 10 are stored in the Shared Memory 15.

The drive substrate 13 performs communication with the storage device 17 for reading data from the storage device 17 and writing data to the storage device 17. The internal switch 16 is configured by using a high-speed crossbar Switch, for example. It should be noted that the communication performed via the internal switch 16 is performed in accordance with protocols, for example, Fibre Channel, iSCSI, TCP/IP, and the like.

The storage device 17 is configured of a plurality of storage drives 171. The storage drives 171 are hard disk drives of, for example, SAS (Serial Attached SCSI), SATA (Serial ATA), FC (Fibre Channel), PATA (Parallel ATA), SCSI, and other types, semiconductor storage devices (SSDs), and the like.

The storage device 17 provides the storage area of the storage device 17 to the server apparatus 3 in units of logical storage areas provided by controlling the storage drives 171, for example, by RAID (Redundant Arrays of Inexpensive (or Independent) Disks) and other methods. This logical storage area is, for example, a storage area of a logical device (an LDEV 172 (LDEV: Logical Device)) configured by using a RAID group (Parity Group).

Furthermore, the storage apparatus 10 provides the logical storage area configured by using the LDEV 172 (hereinafter also referred to as an LU (Logical Unit, Logical Volume) 173) to the server apparatus 3. An identifier (hereinafter also referred to as an LUN) is attached to each of the LUs 173. The storage apparatus 10 manages the correspondence (relationship) between the LUs 173 and the LDEVs 172. Based on the above-mentioned correspondence, the storage apparatus 10 identifies the LDEVs 172 corresponding to the LUs 173 and identifies the LUs 173 corresponding to the LDEVs 172.

Figure 5:
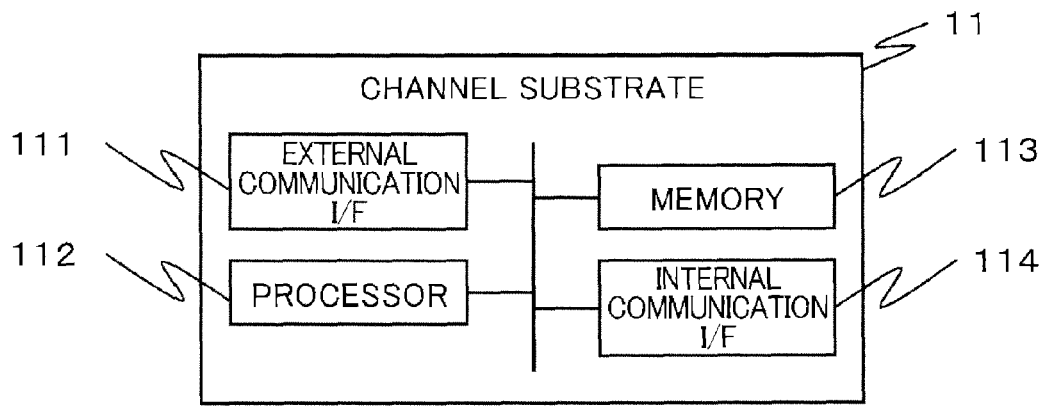
FIG. 5 is a diagram showing the hardware configuration of a channel substrate 11.

The hardware configuration of the channel substrate 11 is shown in FIG. 5. The channel substrate 11 includes an external communication interface (hereinafter referred to as an external communication I/F 111 having a port (a communication port) for communicating with the server apparatus 3, a processor 112 (including a frame processing chip and a frame transfer chip), a memory 113, an internal communication interface (hereinafter referred to as an internal communication I/F 114) having a port (a communication port) for communicating with the processor substrate 12, and the like.

The external communication I/F 111 is configured by using an NIC (Network Interface Card), an HBA (Host Bus Adaptor), and the like. The processor 112 is configured by using a CPU (Central Processing Unit), an MPU (Micro Processing Unit), and the like. The memory 113 is a RAM (Random Access Memory) or a ROM (Read Only Memory). A microprogram is stored in the memory 113. Various functions provided by the channel substrate 11 are implemented by the processor 112 reading the above-mentioned microprogram from the memory 113 and executinging the same. The internal communication I/F 114 communicates with the processor substrate 12, the drive substrate 13, the Cache Memory 14, and the Shared Memory 15 via the internal switch 16.

Figure 6:
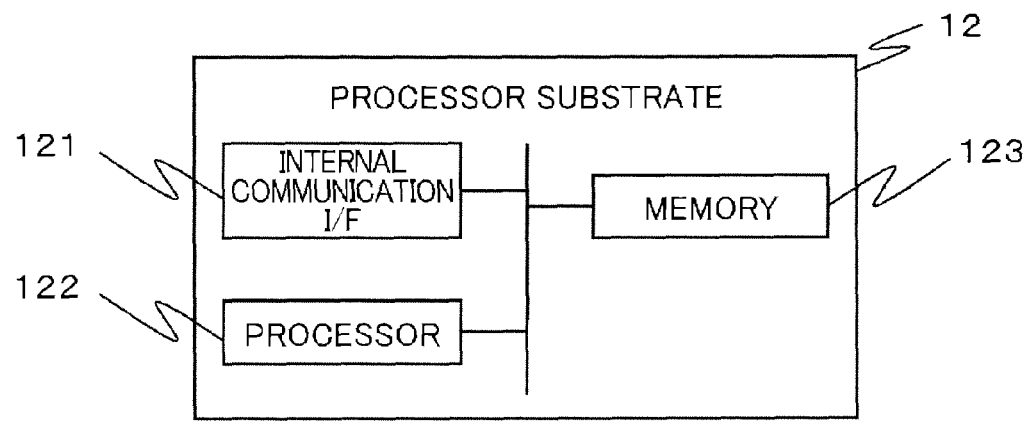
FIG. 6 is a diagram showing the hardware configuration of a processor substrate 12.

A hardware configuration of the processor substrate 12 is shown in FIG. 6. The processor substrate 12 comprises an internal communication interface (hereinafter referred to as an internal communication I/F 121), a processor 122, and a memory 123 (local memory) having high access performance (capable of high-speed access) from the processor 122 compared with the Shared Memory 15. A microprogram is stored in the memory 123. Various functions provided by the processor substrate 12 are implemented by the processor 122 reading the above-mentioned microprogram from the memory 123 and executing the same.

The internal communication I/F 121 communicates with the channel substrate 11, the drive substrate 13, the Cache Memory 14, and the Shared Memory 15 via the internal switch 16. The processor 122 is configured by using a CPU, an MPU, a DMA (Direct Memory Access), and the like. The memory 123 is a RAM or a ROM. The processor 122 can access both the memory 123 and the Shared Memory 15.

Figure 7:
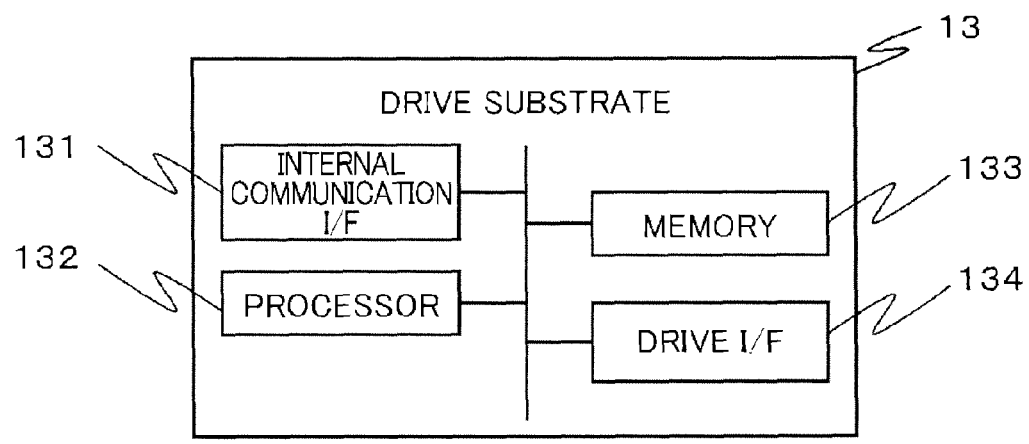
FIG. 7 is a diagram showing the hardware configuration of a drive substrate 13.

The hardware configuration of the drive substrate 13 is shown in FIG. 7. The drive substrate 13 includes an internal communication interface (hereinafter referred to as an internal communication I/F 131), a processor 132, a memory 133, and a drive interface (hereinafter referred to as a drive I/F 134). A microprogram is stored in the memory 133. Various functions provided by the drive substrate 13 are implemented by the processor 132 reading the above-mentioned microprogram from the memory 133 and executing the same. The internal communication I/F 131 communicates with the channel substrate 11, the processor substrate 12, the Cache Memory 14, and the Shared Memory 15 via the internal switch 16. The processor 132 is configured by using a CPU, an MPU, and the like. The memory 133 is, for example, a RAM or a ROM. The drive I/F 134 performs communication with the storage device 17.

The maintenance apparatus 18 shown in FIG. 4 performs the control of the respective components and the status monitoring of the storage apparatus 10. The maintenance apparatus 18 is a personal computer, an office computer, and the like. The maintenance apparatus 18 performs communication as needed with the components in the storage apparatus 10 such as the channel substrate 11, the processor substrate 12, the drive substrate 13, the Cache Memory 14, the Shared Memory 15, the internal switch 16, via communication means such as the internal switch 16 and the exclusively prepared LAN, acquires operation information from the respective components, and provides the information to the management apparatus 19. Furthermore, the maintenance apparatus 18 performs setting, control, and maintenance (including the installation and update of software) of the respective components based on the control information and operation information transmitted from the management apparatus 19.

The management apparatus 19 is a computer which is communicatively coupled to the maintenance apparatus 18 in the storage apparatus 10 via LAN and the like. The management apparatus 19 comprises a user interface (a GUI (Graphical User Interface), a CLI (Command Line Interface), and the like) for controlling and monitoring the storage apparatus 10.

It should be noted that the management apparatus 19 may be coupled to the server apparatus 3 besides the case of being coupled to the storage apparatus 10. In this case, the management apparatus 19 may also perform the control of the respective components and the status monitoring of the server apparatus 3 as well as performing the control of the respective components and the status monitoring of the storage apparatus 10. For example, the management apparatus 19 may also perform management and control related to the file system.

Figure 8:
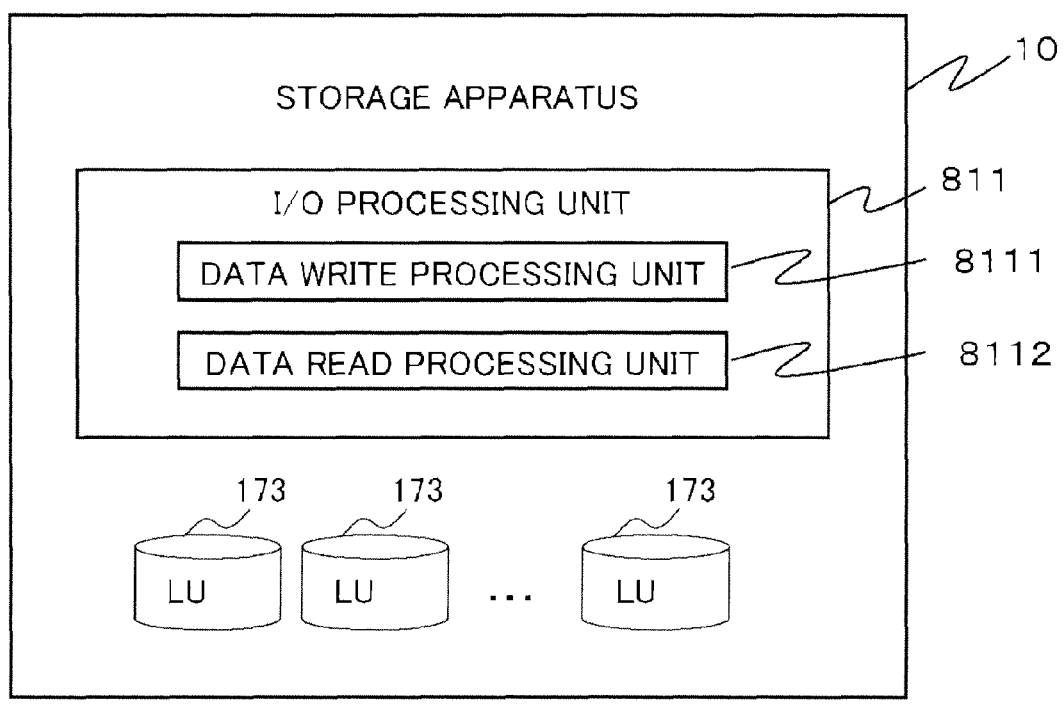
FIG. 8 is a diagram showing basic functions of the storage apparatus 10.

Next, the basic functions of the storage apparatus 10 are shown in FIG. 8. The storage apparatus 10 includes an I/O processing unit 811. The I/O processing unit 811 includes a data write processing unit 8111 which performs processing related to data write to the storage device 17 in the storage apparatus 10 and a data read processing unit 8112 which performs processing related to data read from the storage device 17 in the storage apparatus 10.

It should be noted that the I/O processing unit 811 is implemented by the hardware which the channel substrate 11, the processor substrate 12, or the drive substrate 13 includes or by the processor 112, the processor 122, or the processor 132 reading and executing the microprogram stored in the memory 113, the memory 123, or the memory 133.

Next, basic processing (hereinafter also referred to as the write processing 5900) performed by the data write processing unit 8111 in the I/O processing unit 811 in case the storage apparatus 10 receives a frame including a data write request from the server apparatus 3 is explained with reference to the flowchart shown in FIG. 9. It should be noted that the letter "S" affixed to a reference sign is an abbreviation for step.

Figure 9:
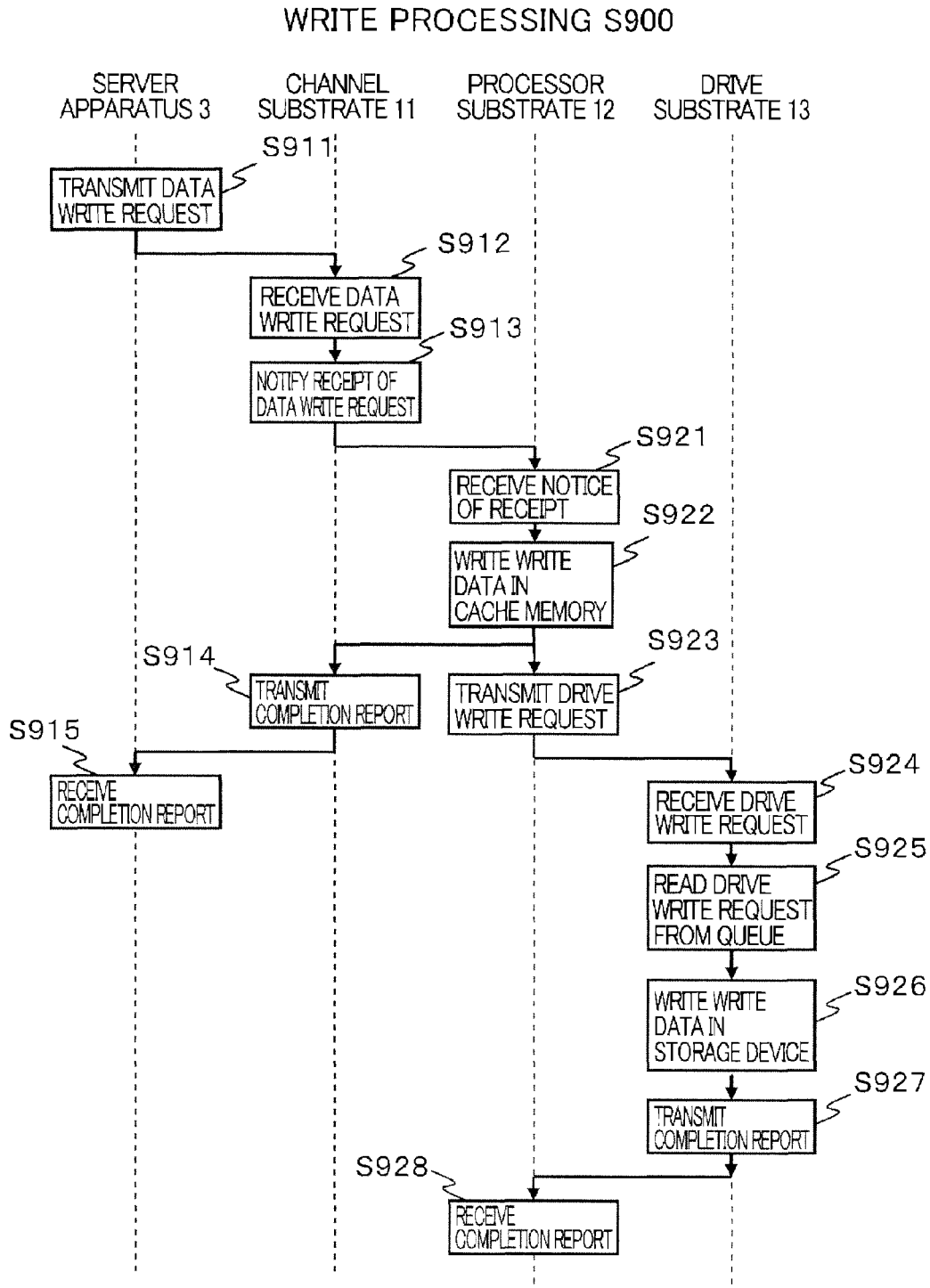
FIG. 9 is a flowchart for explaining write processing S900.

As shown in FIG. 9, firstly, a frame of a data write request transmitted from the server apparatus 3 is received by the channel substrate 11 in the storage apparatus 10 (S911, S912). Upon reception of the frame including the data write request from the server apparatus 3, the channel substrate 11 reports the reception to the processor substrate 12 (S913).

When receiving the above-mentioned notification from the channel substrate 11 (S921), the processor substrate 12 generates a drive write request based on the data write request in the relevant frame, stores the write data in the Cache Memory 14, and also responds to the channel substrate 11 by a reception notification of the above-mentioned notification (S922). Furthermore, the processor substrate 12 transmits the generated drive write request to the drive substrate 13 (S923).

Meanwhile, when receiving the above-mentioned response from the processor substrate 12, the channel substrate 11 transmits a completion report to the server apparatus 3 (S914). The server apparatus 3 receives the completion report from the channel substrate 11 (S915).

When receiving the drive write request from the processor substrate 12, the drive substrate 13 registers the received drive write request in the write processing queue (S924).

The drive substrate 13 reads the drive write request from the write processing queue as needed (S925), reads the write data specified by the read drive write request from the Cache Memory 14, and writes the read write data in the storage device (storage drives 171) (S926). Subsequently, the drive substrate 13 notifies a report (completion report) that the data write related to the drive write request is completed to the processor substrate 12 (S927).

The processor substrate 12 receives the completion report transmitted from the drive substrate 13 (S928).

Next, the I/O processing (hereinafter also referred to as the read processing S1000) performed by the data read processing unit 8112 in the I/O processing unit 811 of the storage apparatus 10 in case the storage apparatus 10 receives a frame including a data read request from the server apparatus 3 is explained with reference to the flowchart shown in FIG. 10.

Figure 10:
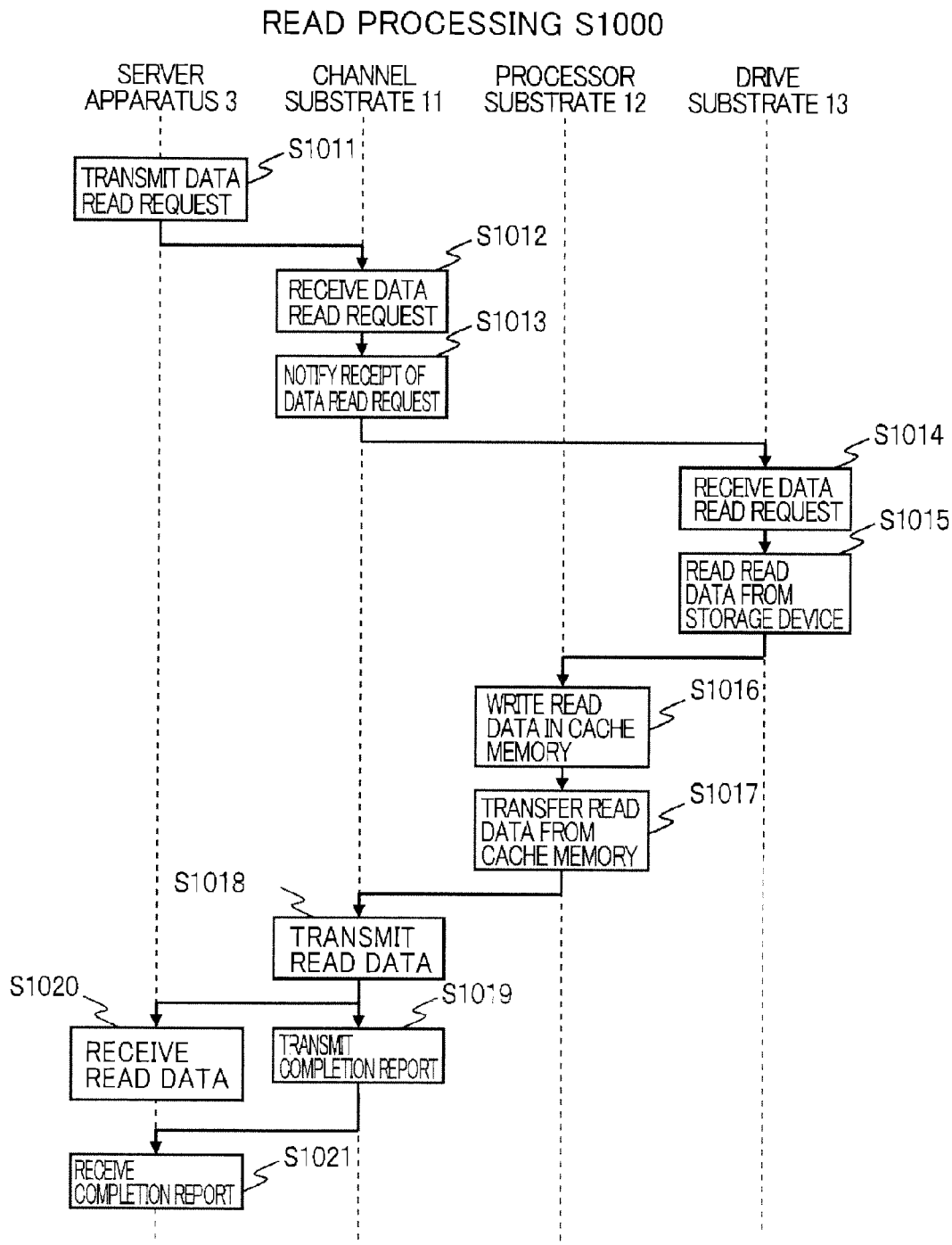
FIG. 10 is a flowchart for explaining read processing S1000.

As shown in FIG. 10, firstly, a frame transmitted from the server apparatus 3 is received by the channel substrate 11 in the storage apparatus 10 (S1011, S1012). When receiving the frame including the data read request from the server apparatus 3, the channel substrate 11 notifies the reception to the drive substrate 13 (S1013).

When receiving the above-mentioned notification from the channel substrate 11 (S1014), the drive substrate 13 reads the data specified by the data read request (for example, specified by an LBA (Logical Block Address)) included in the relevant frame from the storage device (storage drives 171) (S1015). It should be noted that the read processing from the storage device 17 (S1015) is omitted when the read data exists in the Cache Memory 14 (in case of a cache hit).

The processor substrate 12 writes the data which is read by the drive substrate 13 in the Cache Memory 14 (S1016). Subsequently, the processor substrate 12 transfers the data written in the Cache Memory 14 to the channel substrate 11 as needed (S1017).

When receiving the read data transmitted as needed from the processor substrate 12, the channel substrate 11 transmits the data to the server apparatus 3 sequentially (S1018). When the transmission of the read data is completed, the channel substrate 11 transmits a completion report to the server apparatus 3 (S1019). The server apparatus 3 receives the read data and the completion report (S1020, S1021).

Figure 11:
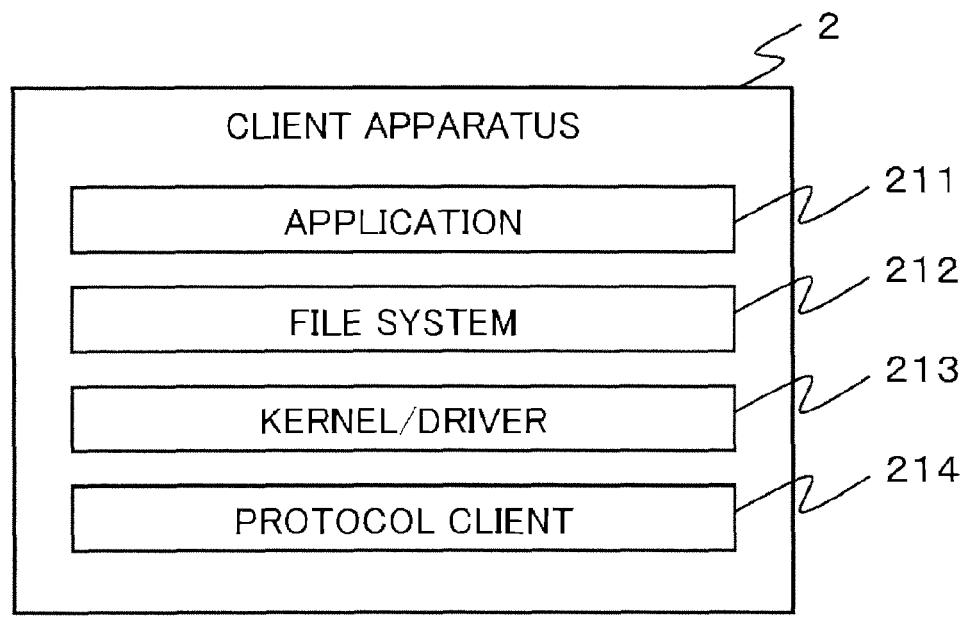
FIG. 11 is a diagram showing main functions of the client device 2.

Next, FIG. 11 shows the main functions of the client device 2. The client device 2 includes functions of an application 211, a file system 212, a kernel/driver 213, and a protocol client 214. It should be noted that these functions are implemented by the processor 21 in the client device 2 reading and executing the programs stored in the memory 22 and the storage device 23.

The application 211 is a program executed to provide an information processing service to the users and the like of the Edges 50. The client device 2 executes I/O operations such as transmitting data I/O requests (read requests and write requests) in units of files to the first storage system 8a by the client device 2 executing the application 211.

For the client device 2, the file system 212 implements the I/O function in units of files or in units of directories to the logical volumes (LUs) 173. The file system 212 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, NFS, CIFS, and the like.

The kernel/driver 213 is implemented by running a kernel module and a driver module configuring the software of the operating system. For software executed in the client device 2, programs for implementing the basic functions of the operating system are included in the kernel module. The basic functions of the operating system are such as process management, process scheduling, storage area management, and handling of interrupt requests from the hardware. Programs and the like for the kernel module to communicate with the hardware configuring the client device 2 and the peripherals used by coupling to the client device 2 are included in the driver module.

The protocol client 214 performs processing related to protocols such as NFS and CIFS in cooperation with the protocol server 320 performed in the first server apparatus 3a when the client device 2 performs I/O operations such as read requests and write requests for the first storage system 8a.

Figure 12:
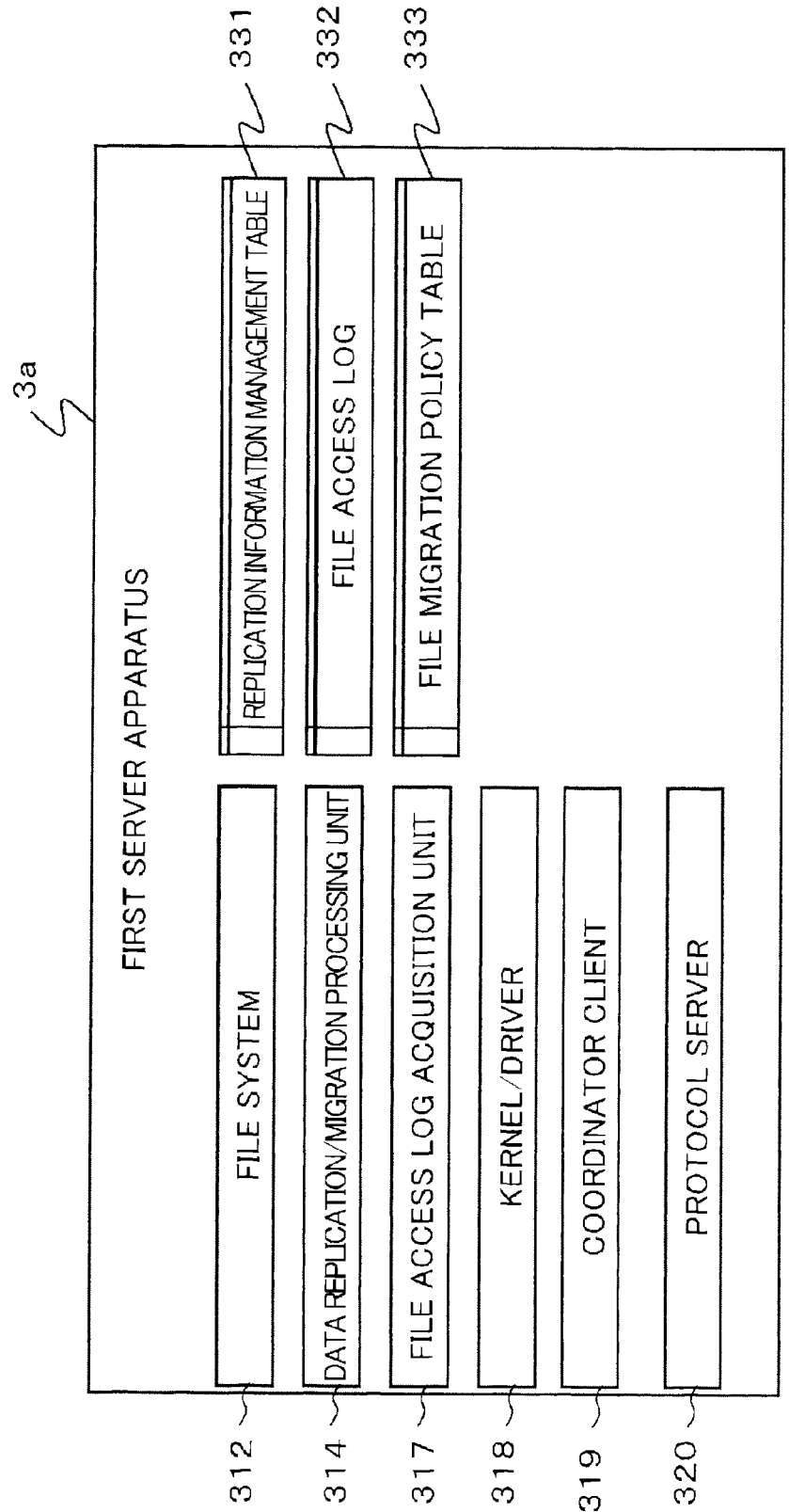

Next, the main functions of the first server apparatus 3a and the main information (data) managed in the first server apparatus 3a are shown in FIG. 12. The first server apparatus 3a includes functions of a file system 312, a data replication/migration processing unit 314, a file access log acquisition unit 317, a kernel/driver 318, a coordinator client 319, and a protocol server 320.

It should be noted that these functions are implemented by the hardware of the first server apparatus 3a or the processor 31 in the first server apparatus 3a reading and executing the programs stored in the memory 32. It should be noted that the functions of the data operation request acceptance unit 313, the data replication/migration processing unit 314, and the file access log acquisition unit 317 may be implemented as functions of the file system 312 and may also be achieved as functions independent of the file system 312.

Furthermore, the first server apparatus 3a manages (stores) information (data) such as a replication information management table 331, a file access log 332, and a file migration policy table 333. These information are stored, for example, in the memory 32 and the storage device 33 in the first server apparatus 3a.

For the client device 2, the file system 312 provides an I/O function for files and directories managed by the logical volumes (LUs) 173 provided by the first storage apparatus 10a. The file system 312 is, for example, FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, NFS, CIFS, and the like.

The data replication/migration processing unit 314 performs various types of file-related control with the other server apparatus 3 (the second server apparatus 3b) or with the storage apparatuses 10 (the first storage apparatus 10a, the second storage apparatus 10b). For example, the data replication/migration processing unit 314 performs transmission/reception of data (including metadata and entity of files), transmission/reception of control information (including flags and tables), management of the various tables, and the like.

Furthermore, the data replication/migration processing unit 314 performs replication control, update control for replication files (files whose replication stored in the first storage apparatus 10a is also stored in the second storage apparatus 10b), reference control for replication files, synchronization control, access control for metadata, reference control for the entity of files, recall control, update control for the entity of stubbed files, and other types of processing, which are explained later.

Replication means that the replication of the metadata and entity of the data of files and directories to be stored in the first storage apparatus 10a is also stored in another storage apparatus 10 (for example, the second storage apparatus 10b).

Stubbing means that the metadata of files and directories is managed (stored) in the first storage apparatus 10a while the entity of the data of files and directories is not managed (stored) in the first storage apparatus 10a and is managed (stored) only in another storage apparatus 10 (for example, the second storage apparatus 10b).

A stub indicates the metadata which remains in the first storage apparatus 10a in the above-mentioned case. When the first server apparatus 3a receives a read request or a write request to a stubbed file or directory for which an entity of the file or directory becomes necessary, the entity of the file or directory is transmitted from the other storage apparatus 10 to the first storage apparatus 10a (hereinafter also referred to as recall).

Furthermore, after the metadata and entity of a file to be stored in the first storage apparatus 10a is replicated to the second storage apparatus 10b, in this case the file is stubbed at a specified timing, such processing is also referred to as migration. The specified timing can be, for example, the case where the first server apparatus 3a detects that the remaining storage capacity of the first storage apparatus 10a falls below a specified value, the case where the first server apparatus 3a detects that the usage rate of the storage capacity of the first storage apparatus 10a exceeds a specified rate, the case where the first server apparatus 3a detects a file which is not accessed within a specified period of time after replication, and other cases. Or the files may be stubbed following the replication of the files stored in the first storage apparatus 10a to the second storage apparatus 10b.

Furthermore, at a specified time every day for example (a specified time late at night for example), in accordance with a file migration policy written in the file migration policy table 333 explained later, the data replication/migration processing unit 314 extracts a file to be migrated to the second storage system 8b from the files stored in the first storage apparatus 10a.

Subsequently, the data replication/migration processing unit 314 transmits file migration information including information such as the total data amount of the extracted migration target file and the time period for transmission (Window) to the coordinator client 319, and transmits the extracted migration target file to the second storage system 8b under control of the coordinator client 319.

Specifically speaking, when receiving a notification from the coordinator client 319 that migration can be performed, the data replication/migration processing unit 314 starts to transmit the migration target file to the second storage system 8b.

Furthermore, when receiving a notification from the coordinator client 319 that migration is to be at standby, the data replication/migration processing unit 314 does not transmit the migration target file to the second storage system 8b and remains at standby.

Furthermore, when receiving a notification from the coordinator client 319 that migration cannot be performed, the data replication/migration processing unit 314 suspends the transmission of the file to the second storage system 8b.

When acquiring the file migration information including information such as the total data amount of the migration target file and the information for specifying the time period for transmission (Window) from the data replication/migration processing unit 314, the coordinator client 319 writes the file migration information to the file migration management table 110 which is stored in the shared LU 173 of the second storage apparatus 10b.

The shared LU 173 is a storage area configured to allow data read and write from the first server apparatuses 3a of all the Edges 50.

When the first server apparatus 3a of each of the Edges 50 writes the file migration information describing the total data amount of each of the migration target files, the time period for transmission, and other information in the shared LU 173, the coordinator server 346 executed by the second server apparatus 3b determines whether the migration requested by each of the Edges 50 can be performed or not based on the above-mentioned file migration information and the load on the second storage apparatus 10b. Subsequently, the coordinator server 346 writes the determination result for each of the requests to the file migration management table 110.

The coordinator client 319 of each of the Edges 50 refers to the file migration management table 110 at a specified timing respectively and acquires the determination result on whether migration can be performed or not. Subsequently, the coordinator client 319 notifies the determination result to the data replication/migration processing unit 314.

The kernel/driver 318 is implemented by executing the kernel module and the driver module configuring the software of the operating system. Programs for implementing the basic functions of the operating system for the software executed in the first server apparatus 3a such as process management, process scheduling, storage area management, and handling of interrupt requests from the hardware are included in the kernel module. Programs for the kernel module to communicate with the hardware configuring the first server apparatus 3a and the peripherals used by connection to the first server apparatus 3a are included in the driver module.

When a file stored in the logical volume (LU) 173 in the storage apparatus 10 is accessed (updating a file (Write, Update), reading a file (Read), opening a file (Open), closing a file (Close), and the like), the file access log acquisition unit 317 stores the information (hereinafter also referred to as an access log) indicating the contents (history) of the access as an file access log 332 while providing a timestamp based on the date and time information acquired from the timer 37.

The protocol server 320 executes processing related to the protocols such as NFS and CIFS in cooperation with the protocol client 214 performed in the client device 2 when the client device 2 performs I/O operations such as read requests and write requests for the first storage system 8a.

Next, an example of the replication information management table 331 is shown in FIG. 13. A host name 3311 to be the replication destination (for example, a network address such as an IP address of the second server apparatus 3b) and a threshold 3312 (hereinafter also referred to as a stubbing threshold) used for determining whether to perform stubbing or not are set in the replication information management table 331.

Although a threshold for performing stubbing in a case the remaining storage capacity of the first storage apparatus 10a falls below 200 GB is set as the stubbing threshold 3312 in the example shown in FIG. 13, the stubbing threshold 3312 can be set in various ways.

For example, a time period (for example, ten days) may be set as the stubbing threshold and a file which has not been read or updated within the period is stubbed. Or an extension of a specific file may be set as the stubbing threshold and stubbing is performed for the file with the extension.

Next, an example of the file access log 332 is shown in FIG. 14. An access log configured of one or more records each configured of respective items of an access date and time 3351, a file name 3352, and a user ID 3353 is recorded in the file access log 332.

Among these items, the date and time on which the file or directory is accessed is set in the access date and time 3351. The file name or directory name of the access target file or directory is set in the file name 3352. The user ID of the user that has accessed the file or directory is set in the user ID 3353.

Next, an example of the file migration policy table 333 is shown in FIG. 15. The file migration policy table 333 includes a "TARGET FILE" field and a "WINDOW" field.

The information indicating the migration target file is written in the "TARGET FILE" field. The information indicating the period of time in which the migration target file is migrated is written in the "WINDOW" field. Although migration may be performed at any point of time within the time period shown in the "WINDOW" field, the ending time of the time period in the "WINDOW" field is the time limit for migration.

The example shown in FIG. 15 shows that, among the files stored in the first storage apparatus 10a, the entity of a synchronization necessity file and the metadata of the synchronization necessity file are both migrated to the second storage apparatus 10b between 10 pm and 6 am.

While the details are explained later, an entity of the synchronization necessity file indicates the entity of a file whose entity synchronization necessity flag is set ("1") in the inode management table 2212. Furthermore, a metadata of the synchronization necessity file indicates the metadata of a file whose metadata synchronization necessity flag is set ("1") in the inode management table 2212.

Furthermore, the "WINDOW" field in the file migration policy table 333 is the information which specifies the time period in which migration is performed (the point of time at which migration may be started and the time limit for migration). This time period is appropriately set by the system administrator in accordance with the business configuration and the like of the Edge 50. For example, the example shown in FIG. 15 indicates that, as the period from 10 pm until 6 am is outside business hours for the Edge 50 every day, the entity and metadata of the file updated or generated in the Edge 50 on the latest business day is migrated to the Core 51 during this period.

The contents written in the file migration policy table 333 may also be in various forms in addition to what is shown in FIG. 15. For example, a specific extension attached to a file, stored in the first storage apparatus 10a is written in advance, and this file with this extension may be made the target of migration.

Figure 16:
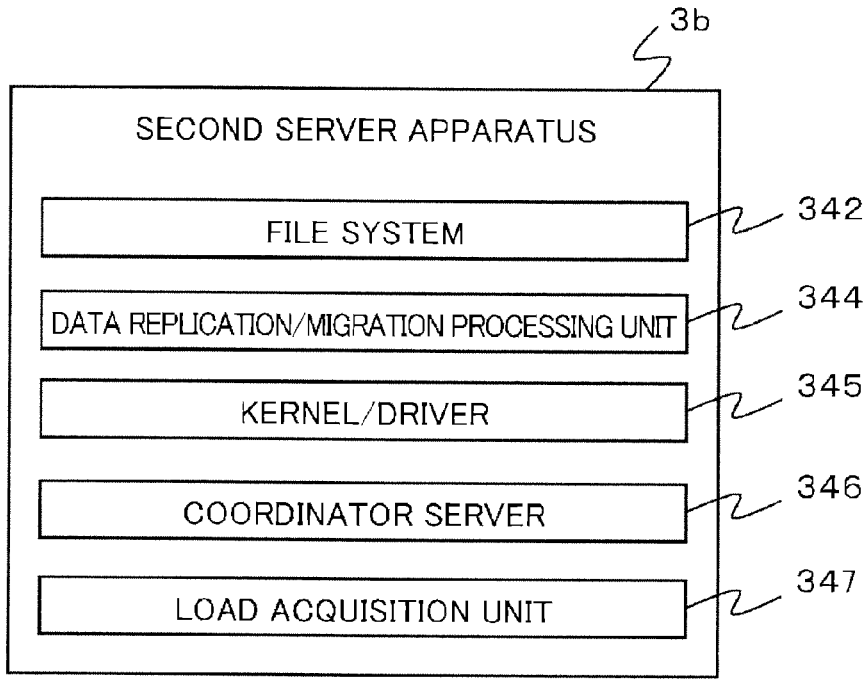
FIG. 16 is a diagram showing main functions of a second server apparatus 3b.

Next, the main functions of the second server apparatus 3b are shown in FIG. 16. The second server apparatus 3b includes functions of a file system 342, a data replication/migration processing unit 344, a kernel/driver 345, a coordinator server 346, and a load acquisition unit 347. It should be noted that the function of the data replication/migration processing unit 344 may be implemented as a function of the file system 342 or may be implemented as an independent function from the file system 342.

The file system 342 uses the logical volumes (LU) 173 provided by the second storage apparatus 10b to provide an I/O function for the logical volumes (LUs or virtual LUs) in units of files or directories to the first server apparatus 3a. The file system 342 is, for example, FAT, NTFS, HFS, ext2, ext3, ext4, UDF, HPFS, IFS, UFS, VTOC, XFS, NFS, CIFS, and the like.

The data replication/migration processing unit 344 perform is the processing related to data migration and replication with the first server apparatus 3 and the second storage apparatus 10b. For example, when a migration target file is transmitted from the first server apparatus 3a, the data replication/migration processing unit 344 receives the file and writes the file to a specified storage area of the second storage apparatus 10b.

The kernel/driver 345 is implemented by executing the kernel module and the driver module configuring the software of the operating system. For the software performed in the second server apparatus 3b, programs for implementing basic functions of the operating system such as process management, process scheduling, storage area management, and handling of interrupt requests from hardware are included in the kernel module. Programs for the kernel module to communicate with the hardware configuring the second server apparatus 3b and the peripherals used by coupling to the second server apparatus 3b are included in the driver module.

The coordinator server 346 refers to the file migration management table 110 stored in the shared LU 173 in the second storage apparatus 10b, at a specified timing, and determines whether migration can be performed or not so that the load on the second storage apparatus 10b does not exceed the processing ability based on each file migration information stored in the file migration management table 110 and the current load on the second storage apparatus 10b. Subsequently, the coordinator server 346 associates the determination result to each file migration information and writes the result in the file migration management table 110.

The load acquisition unit 347 acquires the current load on the second storage apparatus 10b. This load on the second storage apparatus 10b is the load when the second storage apparatus 10b receives a migration target file from the first storage system 8a of each of the Edges 50 and performs processing for storing the file in the storage device 17 and the load when the second storage apparatus 10b reads the file stored in the storage device 17 and transmits the file to the first storage system 8a.

The load acquisition unit 347, for example, acquires a reception rate when the second storage apparatus 10b receives the file transmitted from the first storage system 8a (the transfer data amount per unit time) as a load from the kernel/driver 345. For example, when the second storage apparatus 10b, while receiving a file from the first storage system 8a which transmits data of 100 megabytes per second, receives a file from the other first storage system 8a with a communication rate of 200 megabytes per second, the load on the second storage apparatus 10b is assumed to be 300 megabytes per second.

Figure 17:
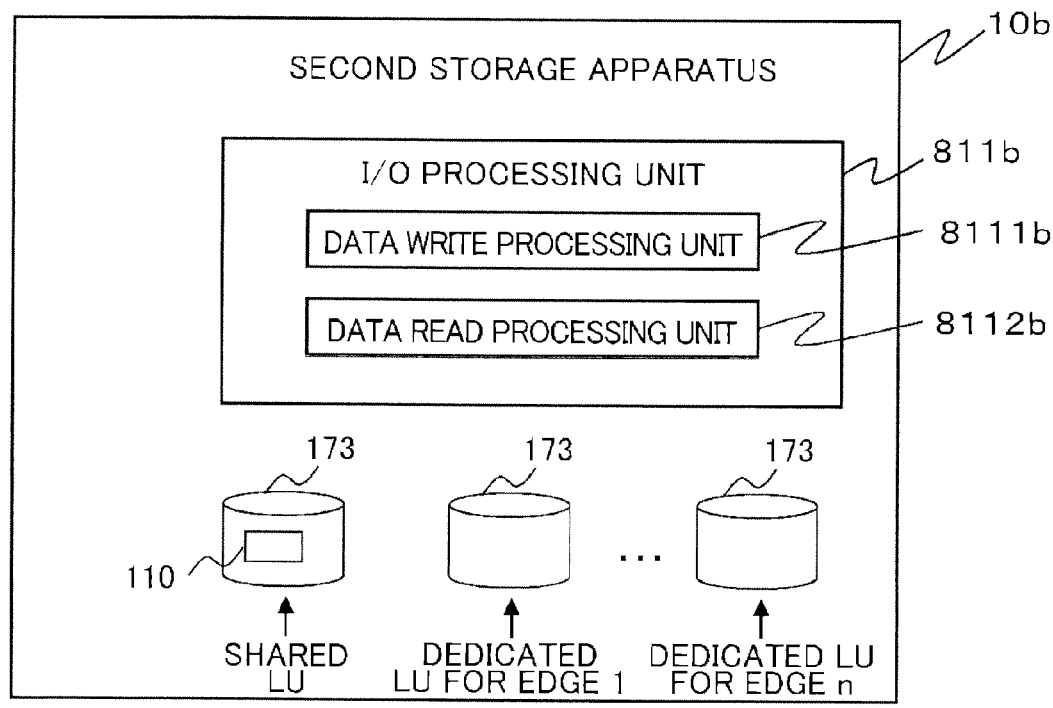
FIG. 17 is a diagram showing main functions of a second storage apparatus 10b.

Next, a configuration of the second storage apparatus 10b is shown in FIG. 17. The second storage apparatus 10b includes an I/O processing unit 811b. The function of the I/O processing unit 811b is the same as the function of the I/O processing unit 811a which the first storage apparatus 10a has.

Furthermore, the second storage apparatus 10b includes a plurality of LUs 173. A file transmitted from the first storage system 8a of each of the Edges 50 to the second storage system 8b is written only to the LU 173 which is respectively assigned to each of the first storage systems 8a. Subsequently, the first storage system 8a of each of the Edges 50 can read the file only from the LU 173 assigned thereto.

Meanwhile, the second storage apparatus 10b includes a shared LU 173 for which read and write is enabled from the first storage systems 8a of all the Edges 50. The file migration management table 110 is stored in this shared LU 173.

Figure 18:
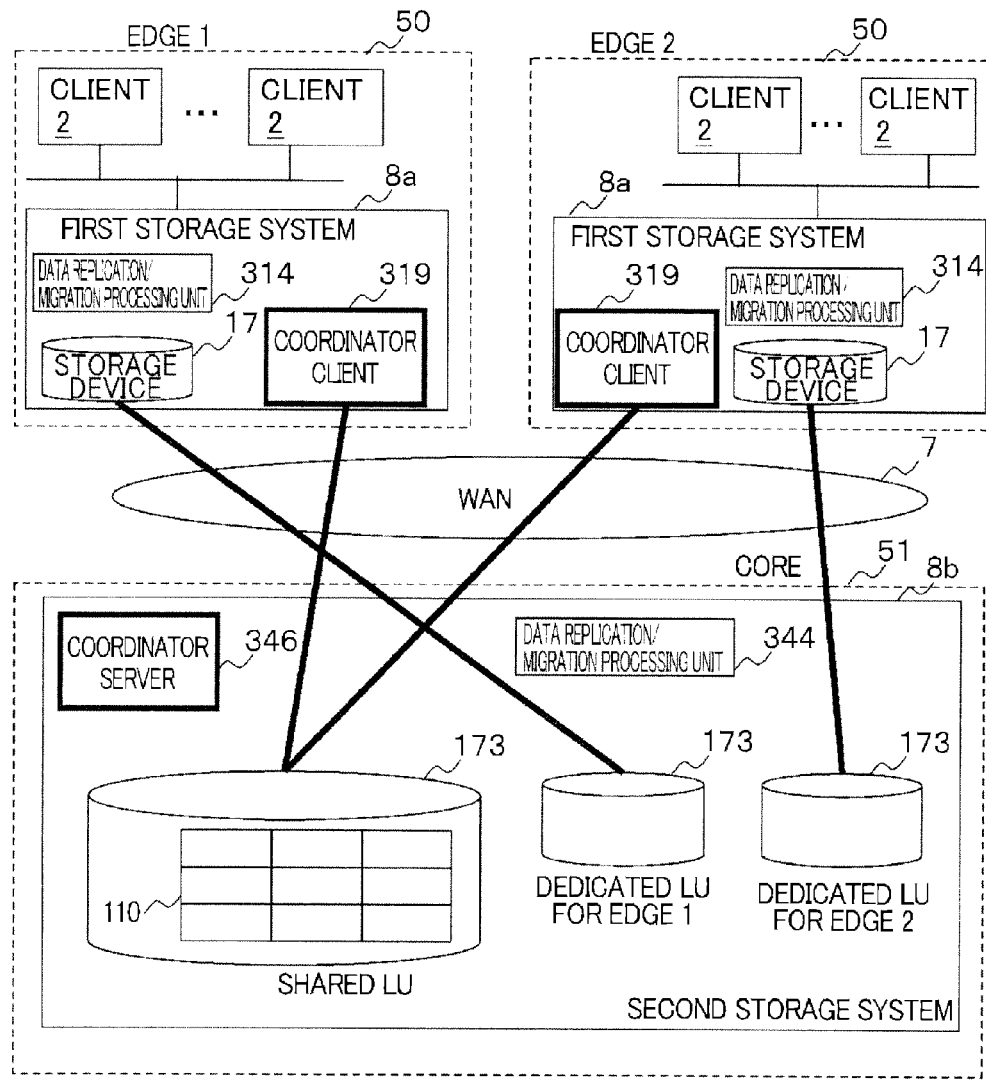
FIG. 18 is a diagram showing the general configuration of the information processing system 1.

FIG. 18 shows a state in which the files transmitted from the first storage systems 8a of the respective Edges 50 to the second storage system 8b are written only to the LUs 173 respectively assigned to the respective Edges 50 and, at the same time, read and write can be performed for the file migration management table 110 stored in the shared LU 173 from the first storage systems 8a of all the Edges 50.

It should be noted that instead of storing the file migration management table 110 in the shared LU 173, a part of the storage area of the LU 173 assigned to a specific Edge 50 is set accessible also from the other Edges 50 and that the file migration management table 110 is stored in this storage area.

Next, an example of the file migration management table 110 is shown in FIG. 19. The file migration management table 110 includes a "NUMBER" field, a "COR (Cloud On Ramp)" field, a "JOB" field, a "WINDOW" field, a "TOTAL TRANSFER AMOUNT" field, an "EFFECTIVE PERFORMANCE" field, a "READ/WRITE" field, a "REMAINING CACHE" field, and a "RESULT" field. It should be noted that the "NUMBER" field is described as "#" in FIG. 19.

Among the values written in these respective fields, the values written in the "COR" field, the "JOB" field, the "WINDOW" field, the "TOTAL TRANSFER AMOUNT" field, the "EFFECTIVE PERFORMANCE" field, the "READ/WRITE" field, and the "REMAINING CACHE" field are those written in the file migration information transmitted from the first server apparatus 3a. Furthermore, the value written in the "NUMBER" field is the value generated by the second storage apparatus 10b or the second server apparatus 3b. Furthermore, the value written in the "RESULT" field is the value written by the second server apparatus 3b.

An identification number for uniquely identifying the file migration information written to the file migration management table 110 by the first server apparatus 3a of each of the Edges 50 is written in the "NUMBER" field. The number written in this "NUMBER" field is provided, for example, by the second storage apparatus 10b when the second storage apparatus 10b writes in the file migration management table 110, the file migration information transmitted from the first server apparatus 3a.

Identification information of the first server apparatus 3a which has transmitted the file migration information is written in the "COR" field.

Information, provided by the first server apparatus 3a which has transmitted the file migration information, for identifying the file migration information is written in the "JOB" field.

Information for specifying the time period for performing migration which is the target of the file migration information (the point of time at which migration may be started and the deadline for migration) is written in the "WINDOW" field. For example, in case of the file migration information whose "#" field in FIG. 19 is 1, it is written that the migration being the target of the file migration information is performed between 10 pm and 6 am next morning.

The total data amount of files transmitted to the second storage apparatus 10b by migration being the target of the file migration information is written in the "TOTAL TRANSFER AMOUNT" field.

The data transfer rate in a case a file is transmitted to the second storage apparatus 10b by migration being the target of the file migration information is written in the "EFFECTIVE PERFORMANCE" field. This data transfer rate may be an actual measured value in the past for example, and may also be an upper limit value or a contract value of the data transfer rate of the second communication network 7 between the first server apparatus 3a and the second server apparatus 3b.

In the "READ/WRITE" field, W is written in a case of writing the file transmitted by the first server apparatus 3a to the second storage apparatus 10b, and R is written in a case the first server apparatus 3a reads the file stored in the second storage apparatus 10b. Specifically speaking, W is written in the case of migration from the first storage system 8a to the second storage system 8b. Meanwhile, R is written in the case of recall which occurs in a case such as when the stubbed file stored in the first storage system 8a is updated and other cases.

The remaining storage capacity of the first storage apparatus 10a in a case the first server apparatus 3a transmits file migration information is written in the "REMAINING CACHE" field. The usage rate of the storage capacity of the first storage apparatus 10a may also be written in this "REMAINING CACHE" field.

The result of the determination performed by the coordinator server 346 as to whether migration can be performed or not based on each file migration information stored in the file migration management table 110, and the processing ability and the load of the second storage apparatus 10b is written in the "RESULT" field. The result of the determination is "ALLOWED", "STANDBY", or "NOT ALLOWED".

The case of "ALLOWED" indicates that the migration being the target of the file migration information can be performed at the current point of time. In this case, the first server apparatus 3a which has written this file migration information to the file migration management table 110 starts to execute the migration.

The case of "STANDBY" indicates that the migration being the target of the file migration information cannot be performed at the current point of time. In this case, the first server apparatus 3a which has written this file migration information to the file migration management table 110 is at a standby for executing the migration.

The case of "NOT ALLOWED" indicates that the migration being the target of the file migration information cannot be completed within the period of time written in the "WINDOW" field. In this case, the first server apparatus 3a which has written this file migration information to the file migration management table 110 suspends the execution of the migration to the second storage apparatus 10b.

File System

Next, the configuration of the file system 312 in the first server apparatus 3a is explained in detail. It should be noted that the file system 342 in the second server apparatus 3b has the same configuration as the file system 312 in the first server apparatus 3a.

Figure 20:
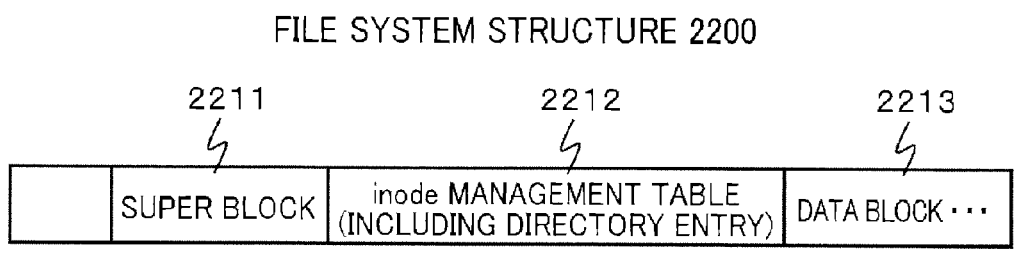
FIG. 20 is a diagram for explaining a file system configuration 2200.

FIG. 20 is an example of the data structure (hereinafter also referred to as a file system structure 2200) which the file system 312 manages in the logical volume 173. The file system configuration 2200 includes the respective storage areas of super block 2211, mode management table 2212, and data block 2213 in which the entity of the file (data) is stored.

Information relating to the file system 312 (the capacity of the storage area which the file system handles, the used amount, the free capacity, and the like) is stored in the super block 2211. The super block 2211 is basically set for each disk partition (partition set in the logical volume 173). Concrete examples of the above-mentioned information stored in the super block 2211 are the number of data blocks in the partition, the size of a data block, the number of free blocks, the number of free modes, the number of mounts in the relevant partition, the elapsed time since the latest consistency check, and the like.

Figure 21:
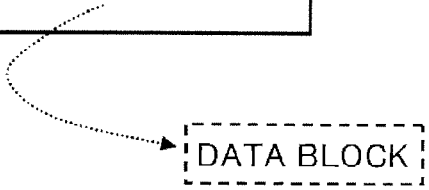
FIG. 21 is a diagram for explaining the concept of inodes.

Management information of a file or directory stored in the logical volume 173 (hereinafter also referred to as an mode) is stored in the mode management table 2212. The file system 312 makes one file or directory correspond to one mode and manages the above. Among the modes, those including only information relating to a directory is referred to as a directory entry. When accessing a file, the data block of the access target file is accessed with reference to the directory entry. For example, when accessing a file "/home/user-01/a.txt", for example, the data block of the access target file is accessed by tracking the mode numbers and directory entries in the order indicated by arrows ("2"->"10"->"15"->"100") as shown in FIG. 21.

Figure 22:
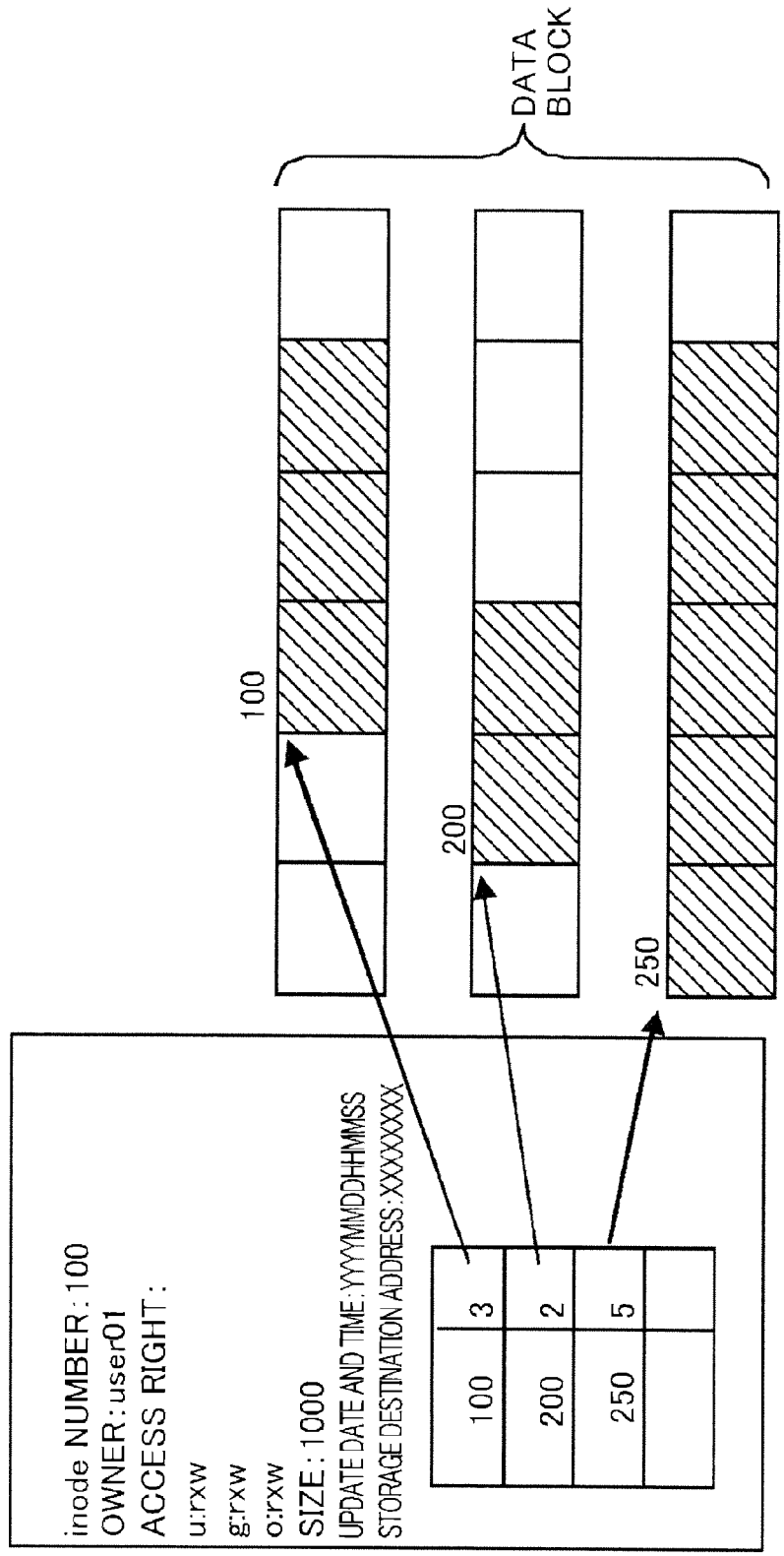
FIG. 22 is a diagram for explaining inode management table 2212.

Next, the concept of an mode in a common file system (for example, a file system of an operating system of the UNIX (registered trademark) series) is shown in FIG. 22. Furthermore, an example of the mode management table 2212 is shown in FIG. 23.

Figure 23:
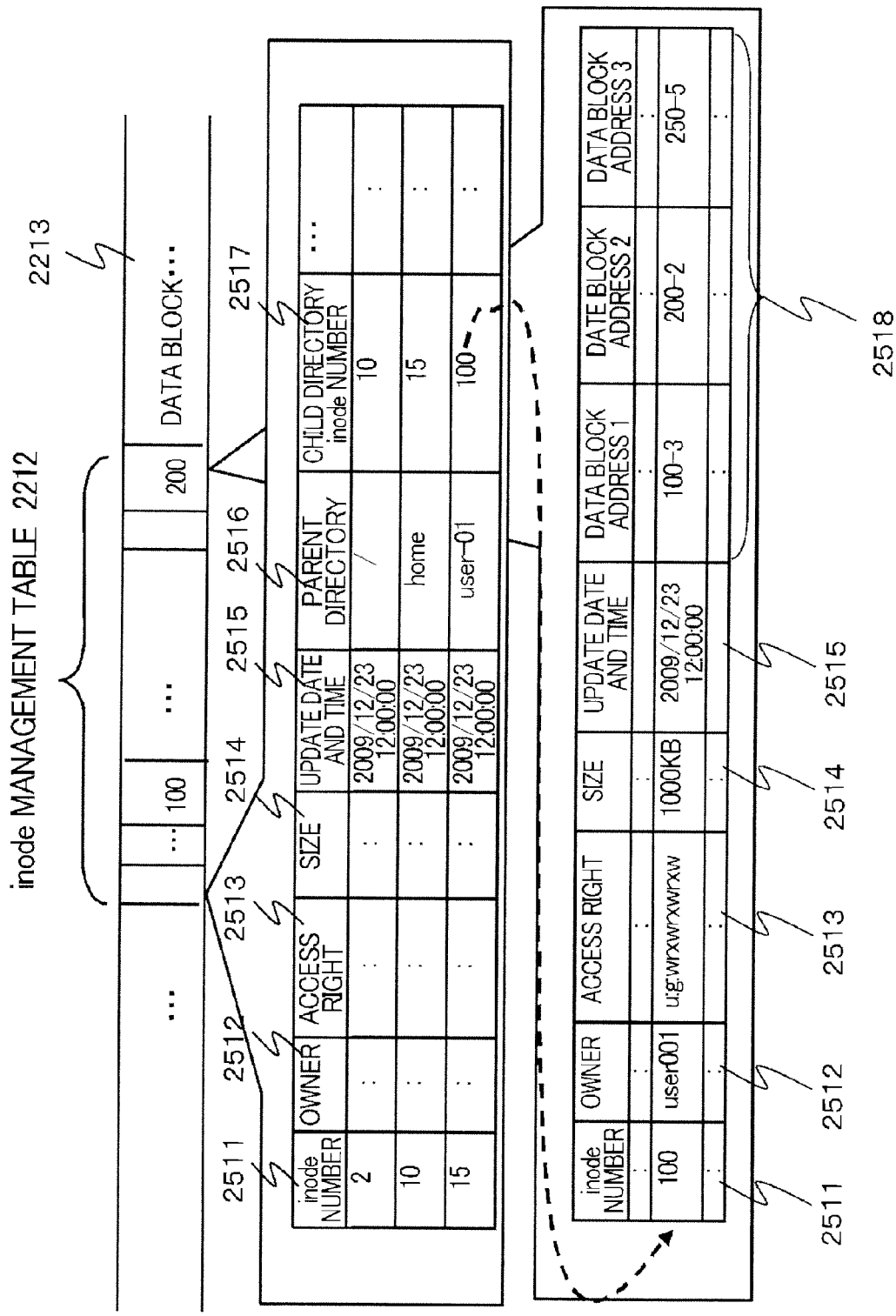
FIG. 23 is a diagram for explaining inode management table 2212.

As shown in FIG. 22 and FIG. 23, an mode includes information such as mode number 2511 which is an identifier for distinguishing individual modes, owner 2512 of the relevant file or directory, access right 2513 which is set as to the relevant file or directory, file size 2514 of the relevant file or directory, last update date and time 2515 of the relevant file or directory, parent directory 2516 of the directory which is set in the case the relevant mode is a directory entry, child directory 2517 of the directory which is set in case the relevant mode is a directory entry, and information for identifying the data block in which the entity of the data of the relevant file is stored (hereinafter also referred to as a block address 2518).

Figure 24:
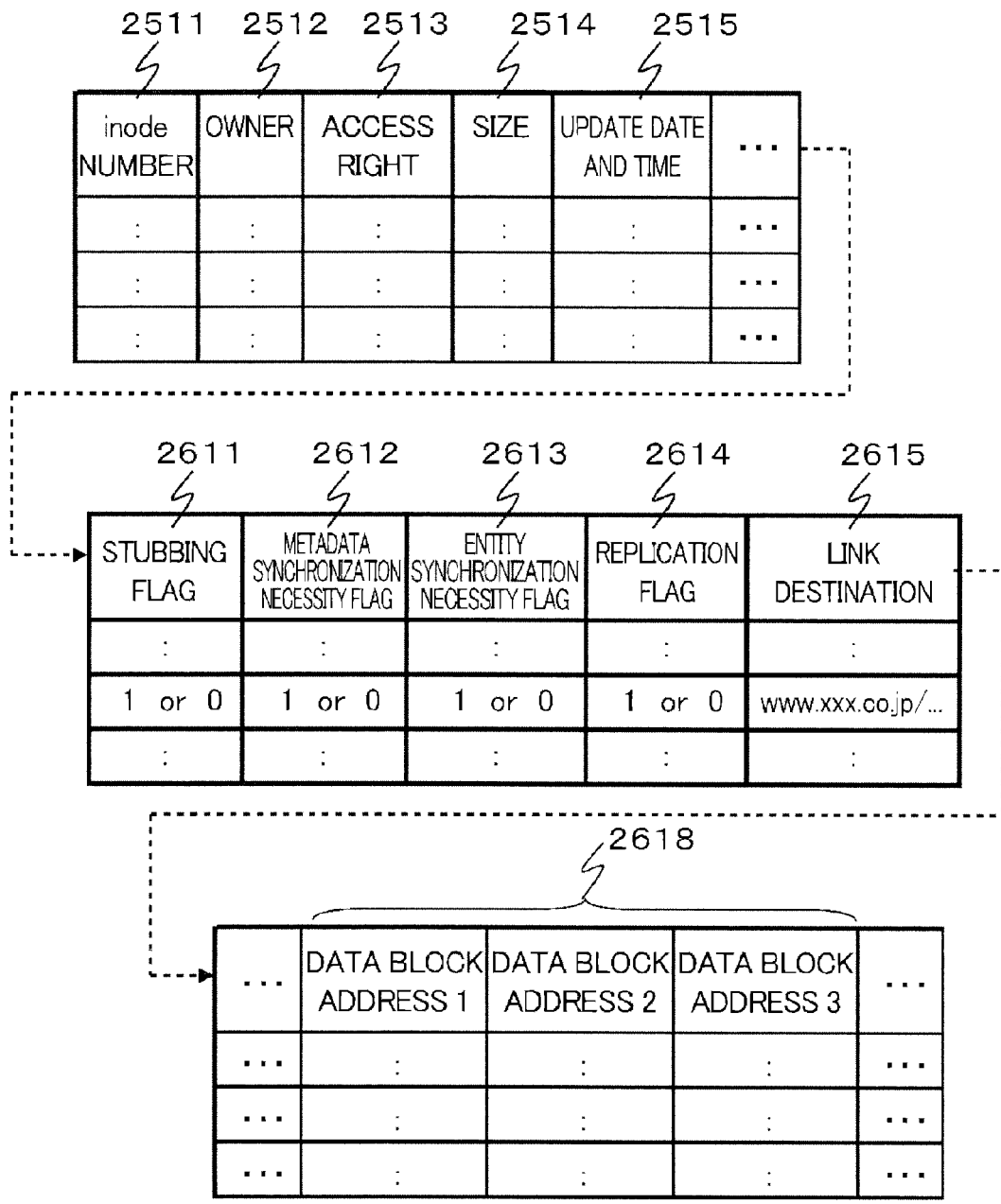
FIG. 24 is a diagram for explaining an inode management table 2212 in the present embodiment.

Furthermore, as shown in FIG. 24, in addition to the contents of the mode management table 2212 in a common file system shown in FIG. 23, the file system 312 further manages stubbing flag 2611, metadata synchronization necessity flag 2612, entity synchronization necessity flag 2613, replication flag 2614, link destination 2615 accompanying the mode management table 2212.

It should be noted that, in the case the replication of the metadata of the file stored in the first storage apparatus 10a (the metadata including the various types of additional information shown in FIG. 24) is also stored in the second storage apparatus 10b (in the case a file is replicated) by a management method by replication or the management method by stubbing and when the metadata of one of the apparatuses is updated by the synchronization processing S3700 explained later, the update is notified to the other apparatus. According to this method, the consistency of the contents between the metadata of the first storage apparatus 10a and the metadata of the second storage apparatus 10b is secured.

In FIG. 24, information indicating whether the file or directory corresponding to the relevant inode is stubbed or not is set in the stubbing flag 2611. When the file or directory corresponding to the relevant inode is stubbed, "1" is set in the stubbing flag 2611 while "0" is set in the stubbing flag 2611 when the file or directory is not stubbed.

Information indicating whether it is necessary or not to synchronize (to match the contents of) the metadata of the file or directory of the first storage apparatus 10a being the replication source with the metadata of the file or directory of the second storage apparatus 10b being the replication destination is set for the metadata synchronization necessity flag 2612. If it is necessary to synchronize the metadata, "1" is set in the metadata synchronization necessity flag 2612 while "0" is set in the metadata synchronization necessity flag 2612 when synchronization is not necessary.

When the file of the first storage apparatus 10a is replicated to the second storage apparatus 10b and when the contents of the metadata of this file is updated only in the first storage apparatus 10a, the metadata stored in the first storage apparatus 10a and the metadata stored in the second storage apparatus 10b become inconsistent. In such case, "1" is set in the metadata synchronization necessity flag 2612.

Information indicating whether it is necessary or not to synchronize (to match the contents) the entity of the data of the file of the first storage apparatus 10a which is the replication source with the entity of the data of the file of the second storage apparatus 10b which is the replication destination is set in the entity synchronization necessity flag 2613. When it is necessary to synchronize the entity of the data of the file, "1" is set for the entity synchronization necessity flag 2613 while "0" is set in the entity synchronization necessity flag 2613 when synchronization is not necessary.

When the file of the first storage apparatus 10a is replicated to the second storage apparatus 10b and when the entity of this file is updated only in the first storage apparatus 10a, the entity of the file stored in the first storage apparatus 10a and the entity of the file stored in the second storage apparatus 10b become inconsistent. In such case, "1" is set in the entity synchronization necessity flag 2613.

The metadata synchronization necessity flag 2612 and the entity synchronization necessity flag 2613 are referred to as needed in the synchronization processing S3700 which is explained later. When either the metadata synchronization necessity flag 2612 or the entity synchronization necessity flag 2613 is set to "1", the metadata or entity of the first storage apparatus 10a and the metadata or entity of the second storage apparatus 10b being a replication thereof are synchronized.

Information indicating whether or not the file or directory corresponding to the inode is currently a target of management by the replication management method which is explained later is set for the replication flag 2614. "1" is set in the replication flag 2614 when the file corresponding to the relevant inode is currently a target of management by the replication management method while "0" is set in the replication flag 2614 when the file is not a target of management by replication.

In a case a file corresponding to the inode is managed by the replication management method explained later, information indicating the replication destination of the file (for example, the path name for identifying a storage destination, the identifier of a RAID group, a block address, a URL (Uniform Resource Locator), an LUN and others) is set in the link destination 2615.

=Description of Processing=

Next, the processing performed in the information processing system 1 is explained.

Figure 25:
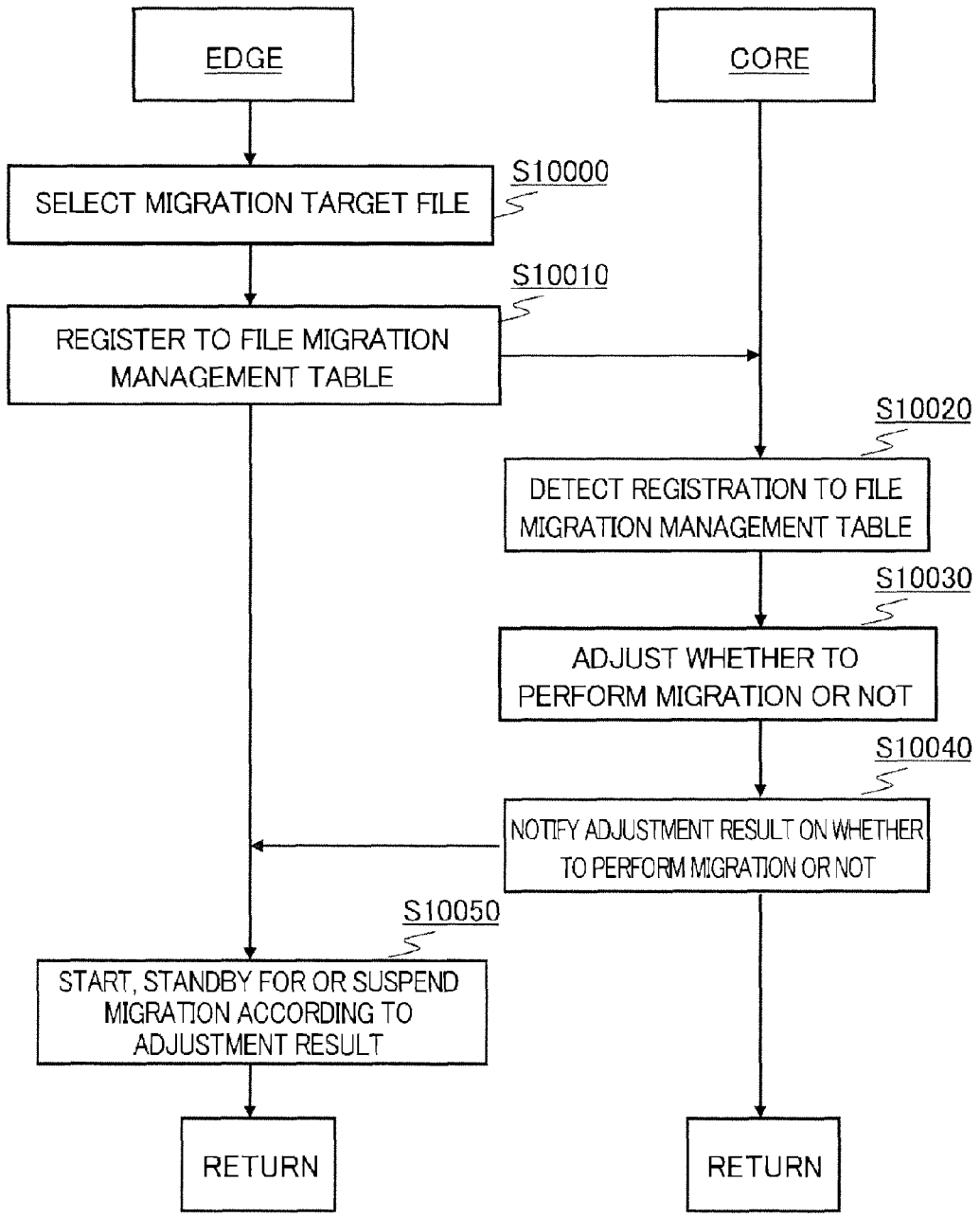
FIG. 25 is a diagram for explaining the flow of the entire processing of the information processing system 1.

Firstly, the flow of the entire processing performed in the information processing system 1 is explained with reference to FIG. 25.

Here, in each of the Edges 50, the client device 2, the first server apparatus 3a, the first storage apparatus 10a perform information processing every day, and files are newly created and updated in the first storage apparatus 10a every day along with the performance of information processing.

As explained above, as for the files newly created in the first storage apparatus 10a and the updated files, "1" is set in the metadata synchronization necessity flag or the entity synchronization necessity flag in the inode management table 2212.

At a specified point of time every day for example, the first storage system 8a refers to the metadata synchronization necessity flag and the entity synchronization necessity flag in the Inode management table 2212, and selects the migration target files (S10000). Subsequently, the first storage system 8a writes the information which specifies the total data amount of the files and the time period for migration (Window) and other information in the file migration information, and registers the information in the file migration management table 110 stored in the shared LU 173 in the second storage system 8b (S10010).

Subsequently, when detecting that the file migration information is registered in the file migration management table 110 (S10020), the second storage system 8b determines whether migration can be performed or not based on the registered file migration information, the processing ability and the load at the point of time on the second storage apparatus 10b (S10030). Subsequently, the second storage system 8b notifies the determination result to the first storage system 8a (S10040).

The first storage system 8a performs, is on standby for, or suspends the migration in accordance with the above-mentioned determination result (S10050).

When receiving the determination from the second storage system 8b that the migration can be performed, the first storage system 8a firstly replicates the migration target file stored in the first storage apparatus 10a to the second storage apparatus 10b, and performs management by the management method by replication. The first storage system 8a performs migration by continuing to stub the file.

The individual processing performed in the information processing system 1 is explained below.

<Replication Processing>

Figure 26:
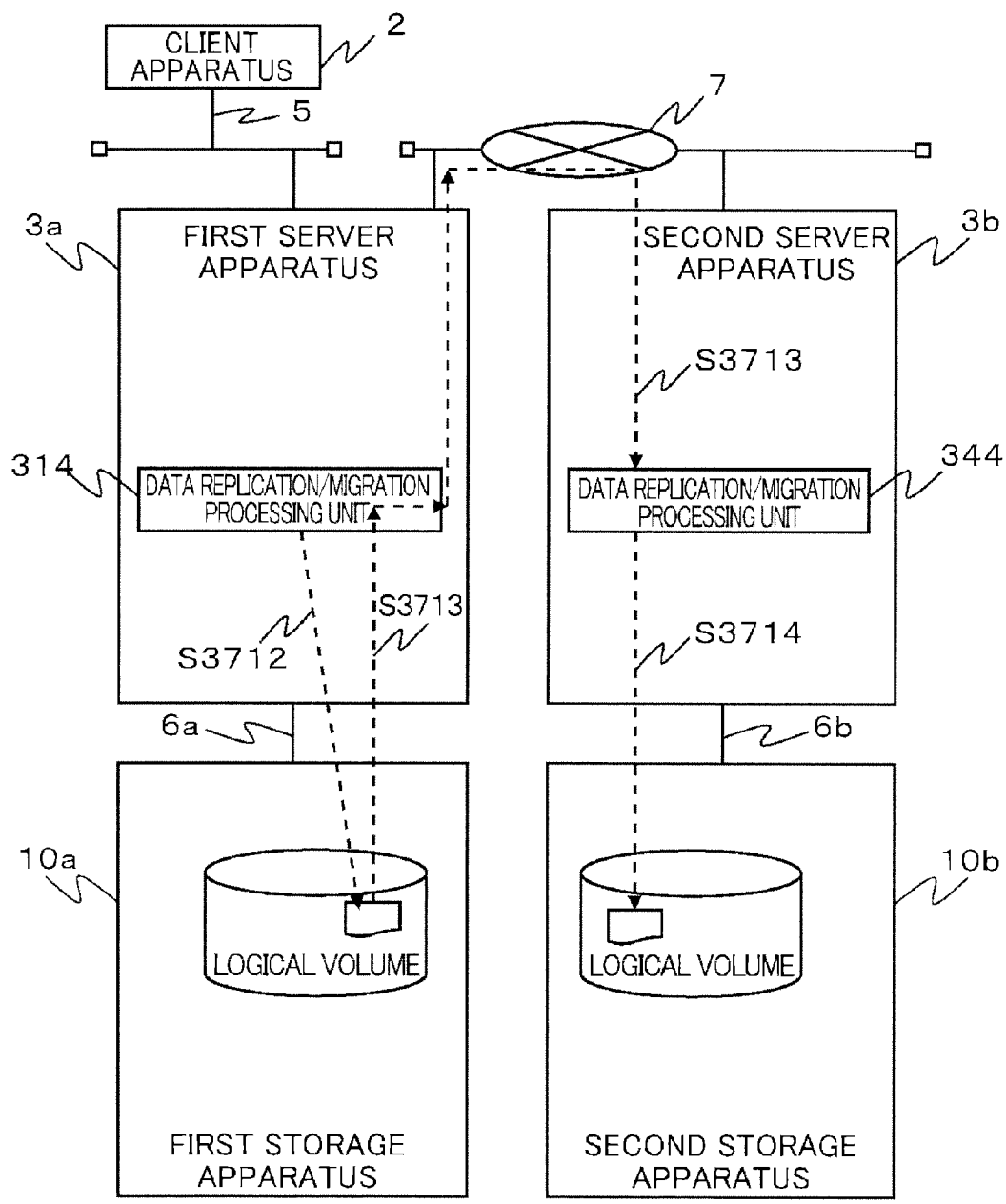
FIG. 26 is a diagram for explaining replication start processing S2700.
Figure 27:
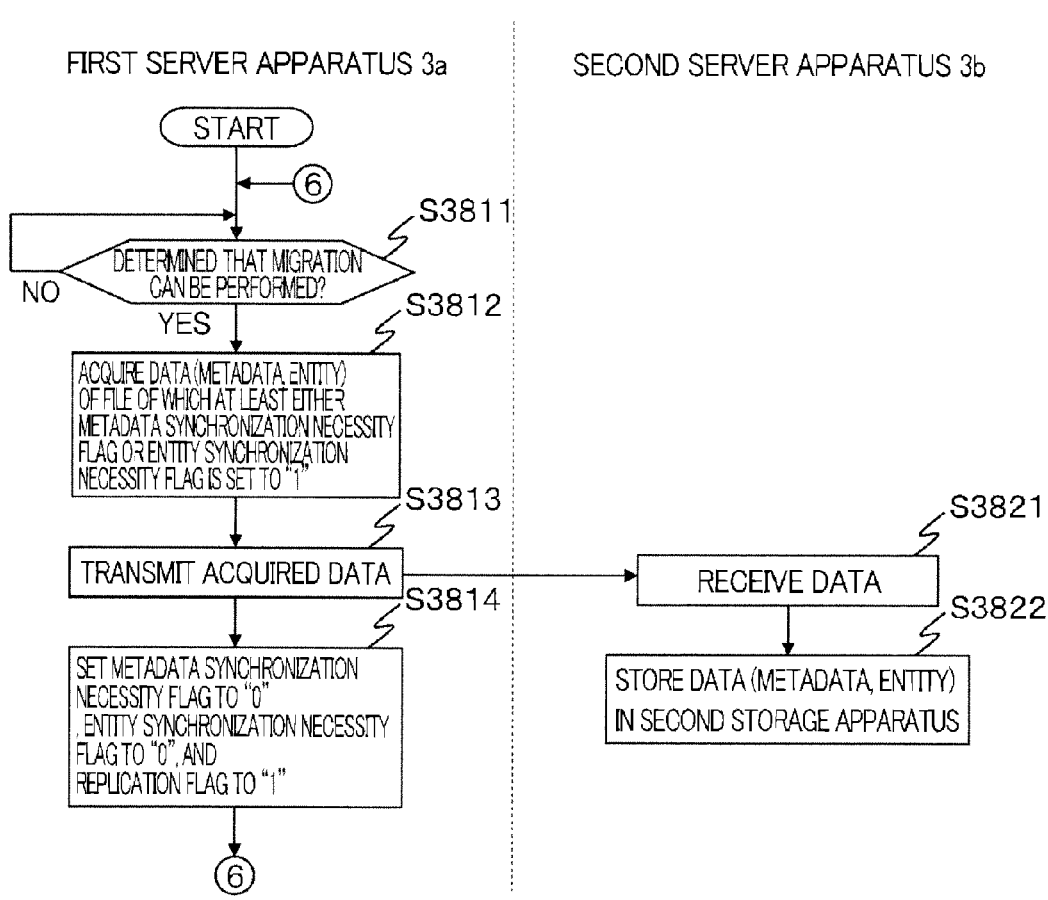
FIG. 27 is a flowchart for explaining replication start processing S2700.

Firstly, the processing of replicating files from the first storage system 8a to the second storage system 8b (hereinafter also referred to as the replication processing S2700) is explained with reference to FIG. 26 and FIG. 27.

The first server apparatus 3a transfers the replication of the replication target file stored in the first storage apparatus 10a to the second storage apparatus 10b, and performs management by the management method by replication for the replication target file.

The management method by replication is a method by which data (metadata and entity) of a file is managed both in the first storage apparatus 10a and in the second storage apparatus 10b. By the management method by replication, when the entity or metadata of a file stored in the first storage apparatus 10a is updated, the metadata or entity of the file in the second storage apparatus 10b, which is managed as the replication (or the archive file) of this file is updated synchronously or asynchronously. By the management method by replication being performed, the consistency between the data (the metadata or the entity) of a file stored in the first storage apparatus 10a and the data (the metadata or the entity) of the file which is stored as the replication of the file in the second storage apparatus 10b is secured (guaranteed) synchronously or asynchronously.

It should be noted that the metadata of a file (an archive file) in the second storage apparatus 10b may also be managed as a file (as the entity of the file). By the above-mentioned method, the operation by the management method by replication can be performed even when the specification of the file system 312 in the first server apparatus 3a and the specification of the file system 342 in the second server apparatus 3b are different.

After registering the file migration information in the file migration management table 110, the first server apparatus 33a monitors the result of the determination as to whether migration can be performed or not (S3811). After receiving the determination result that migration can be performed (S3811:YES), among the files stored in the file storage area in the first storage apparatus 10a, the first server apparatus 3a selects a file of which at least either the metadata synchronization necessity flag 2612 or the entity synchronization necessity flag 2613 is set to "1" as a migration target file (S3712, S3812).

Subsequently, the first server apparatus 3a transmits the metadata or the entity of the acquired file to the second server apparatus 3b, and also sets the metadata synchronization necessity flag 2612 of the relevant file to "0", the entity synchronization necessity flag 2613 to "0", and the replication flag 2614 to "1" (S3713, S3814).

After receiving the metadata or the entity (S3713, S3821), the second server apparatus 3b stores the received metadata or entity in the second storage apparatus 10h (S3714, S3822).

It should be noted that only the updated difference since the last synchronization may be transmitted instead of transmitting the entire metadata or entity to the second server apparatus 3b from the first server apparatus 3a.

Replication is performed by the replication processing S2700, and the replication of the data (the metadata and the entity) of the file stored in the first storage apparatus 10a can be stored in the second storage apparatus 10b.

<Stubbing Candidate Selection Processing>

Figure 28:
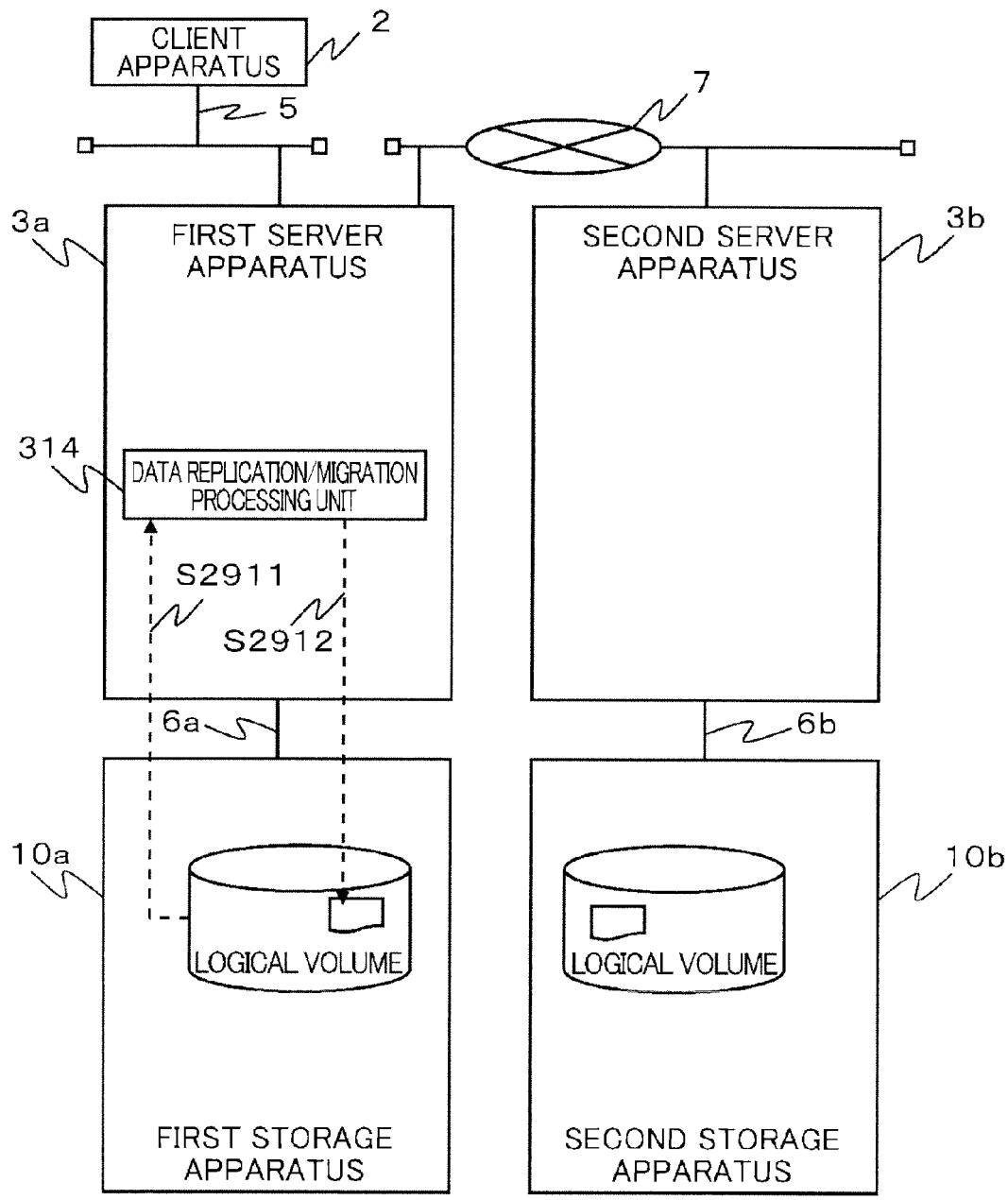
FIG. 28 is a diagram for explaining stubbing candidate selection processing S2900.
Figure 29:
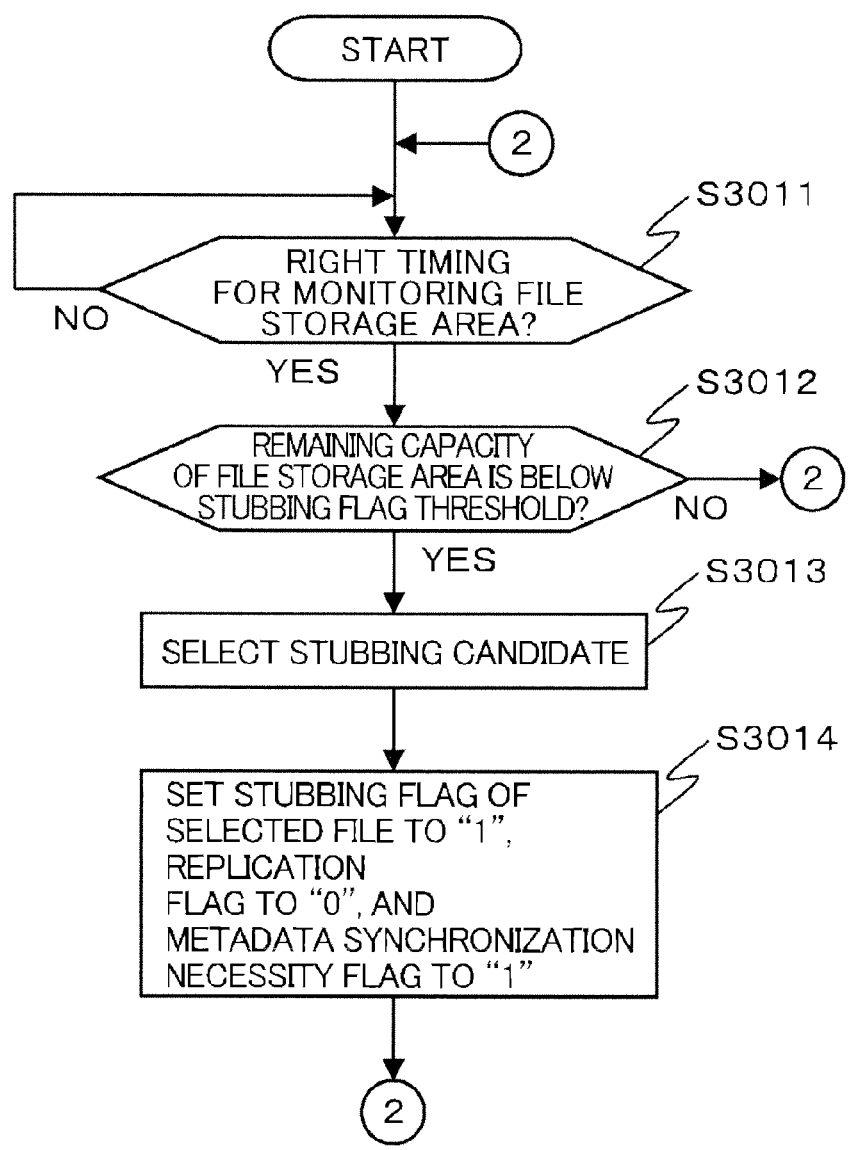
FIG. 29 is a flowchart for explaining stubbing candidate selection processing S2900.

Next, the processing performed in the information processing system 1 for setting a replication file (a file managed by the replication management method (a file whose replication flag 2614 is set to "1")) stored in the first storage apparatus 10a as a candidate for stubbing (hereinafter also referred to as stubbing candidate selection processing S2900) is described with reference to FIG. 28 and FIG. 29.

The first server apparatus 3a selects a migration target file stored in the first storage apparatus 10a as the candidate for stubbing (S2911, S3013).

Next, after selecting the candidate for stubbing, the first server apparatus 3a sets the stubbing flag 2611 of the selected file to "1", the replication flag 2614 to "0", and the metadata synchronization necessity flag 2612 to "1" respectively (S2912 S3014).

<Stubbing Processing>

Figure 30:
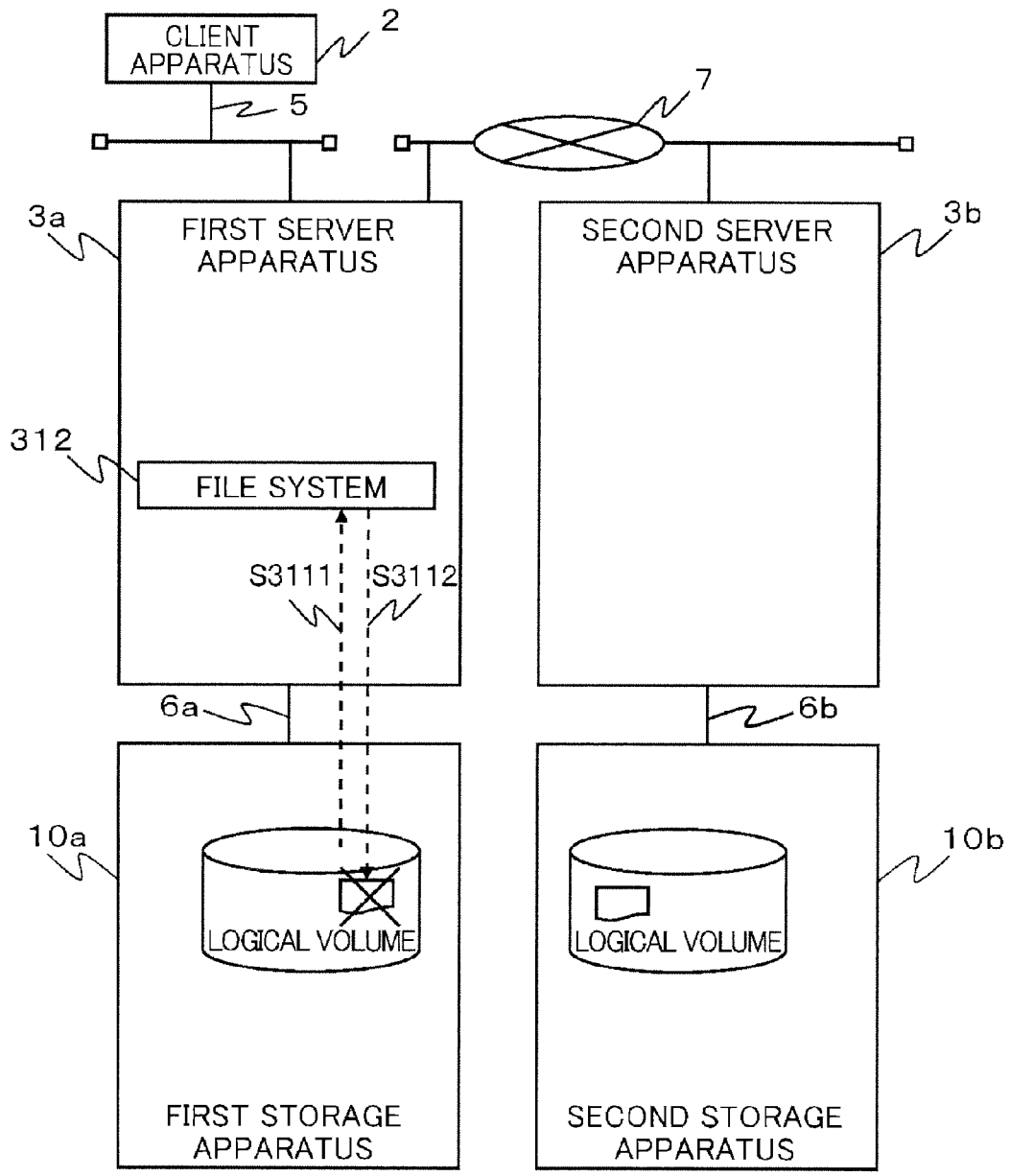
FIG. 30 is a diagram for explaining stubbing processing S3100.
Figure 31:
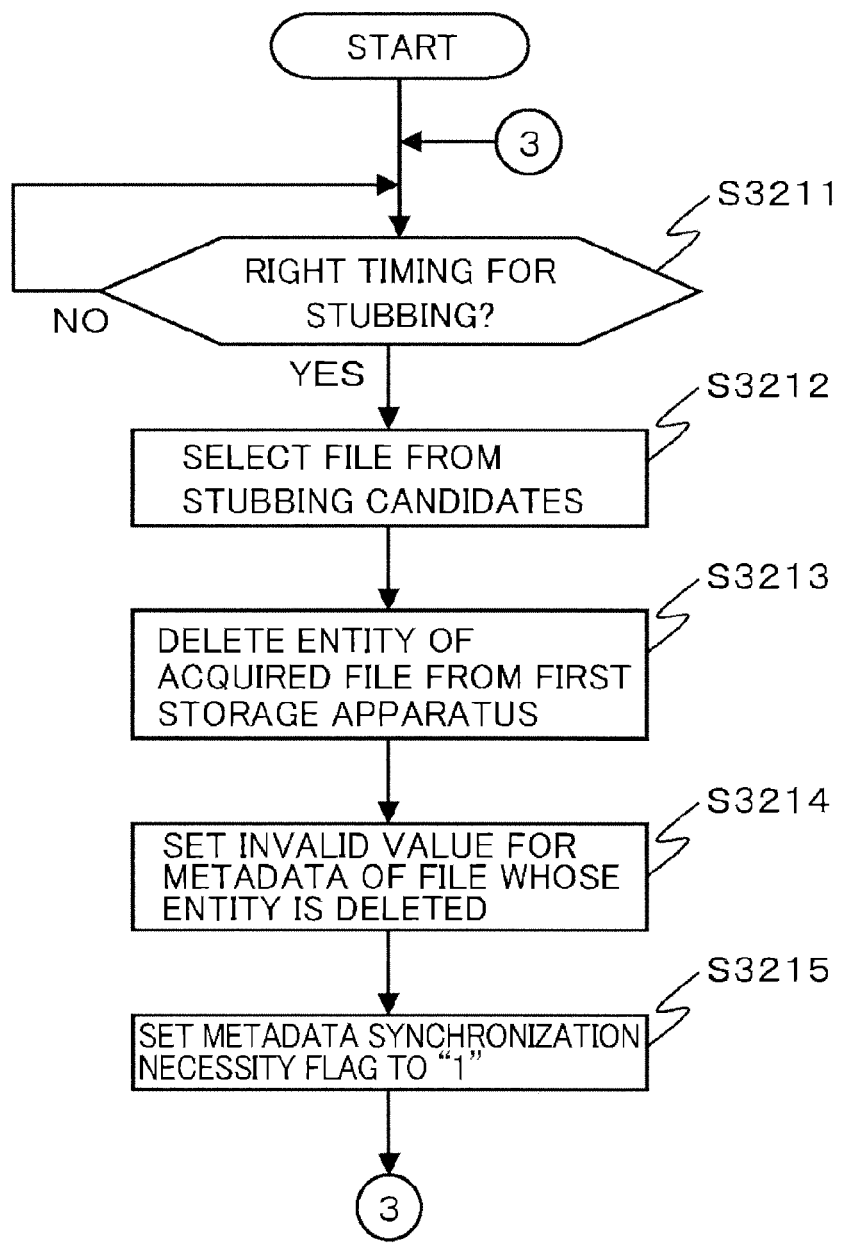
FIG. 31 is a flowchart for explaining stubbing processing S3100.

Next, the processing performed in the information processing system 1 for actually stubbing the migration target file (hereinafter also referred to as stubbing processing S3100) is shown in FIG. 30. Furthermore, the flowchart for explaining the details of the stubbing processing S3100 is shown in FIG. 31.

The stubbing processing S3100 is performed, for example, at the timing which is set in advance (for example, subsequent to the stubbing candidate selection processing S2900), but the timing for starting the stubbing processing S3100 is not necessarily limited to the above. Hereinafter, the stubbing processing S3100 is explained with reference to these figures.

The first server apparatus 3a extracts one or more files as candidates for stubbing from the files stored in the file storage area in the first storage apparatus 10a (S3111, 53211, S3212).

Then, the first server apparatus 3a deletes the entity of the extracted file from the first storage apparatus 10a (S3213), also sets an invalid value for the information indicating the storage destination of the file in the first storage apparatus 10a from the metadata of the extracted file (for example, setting a NULL value or zero in the field for setting the storage destination of the relevant file of the metadata (for example, the setting field of the block address 2618) (S3214)), and actually stubs the stubbing candidate file (S3112). Furthermore, at this point, the first server apparatus 3a sets the metadata synchronization necessity flag 2612 to "1" (S3215).

<Metadata Access Processing>

Figure 32:
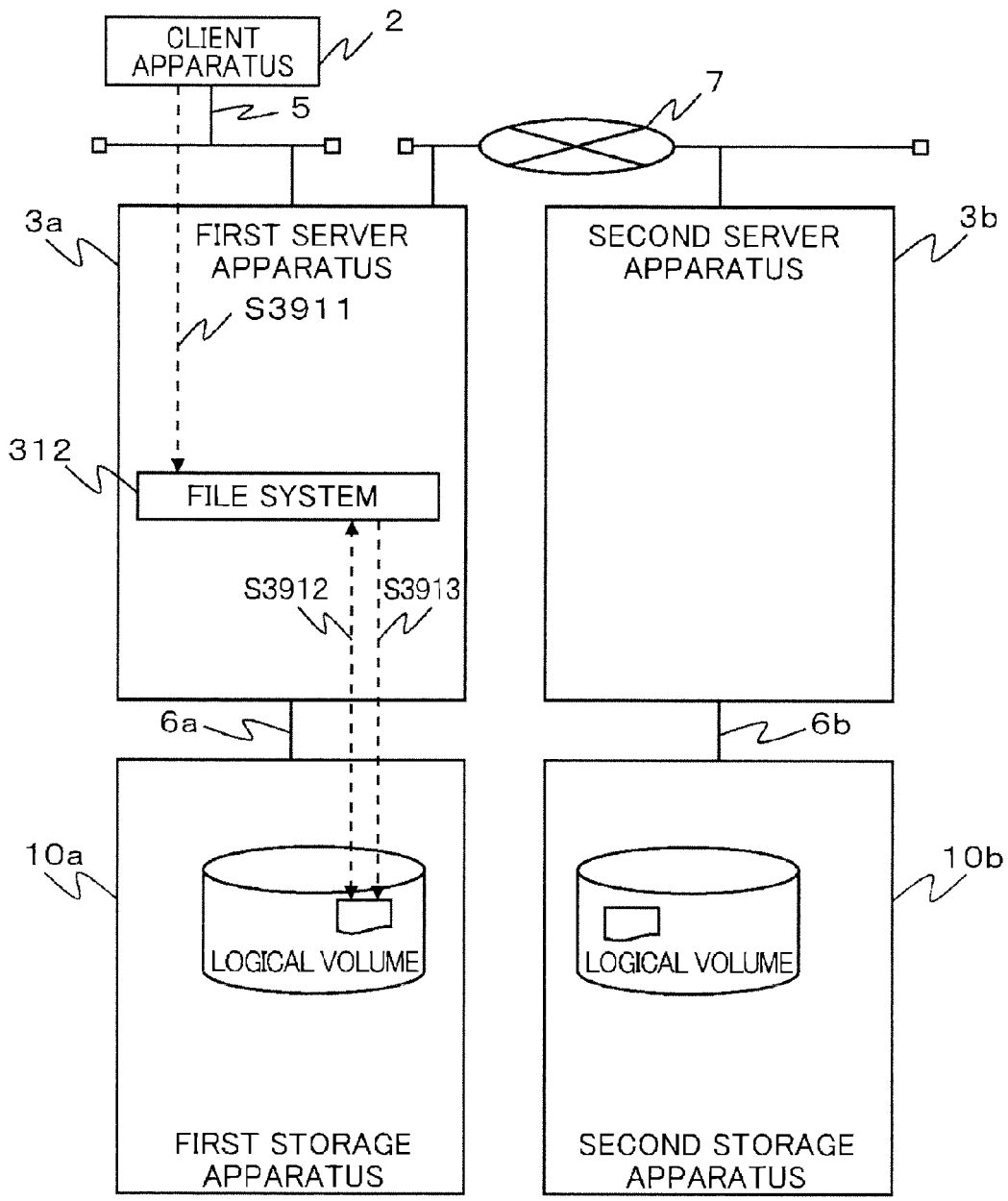
FIG. 32 is a diagram for explaining metadata access processing S3900.
Figure 33:
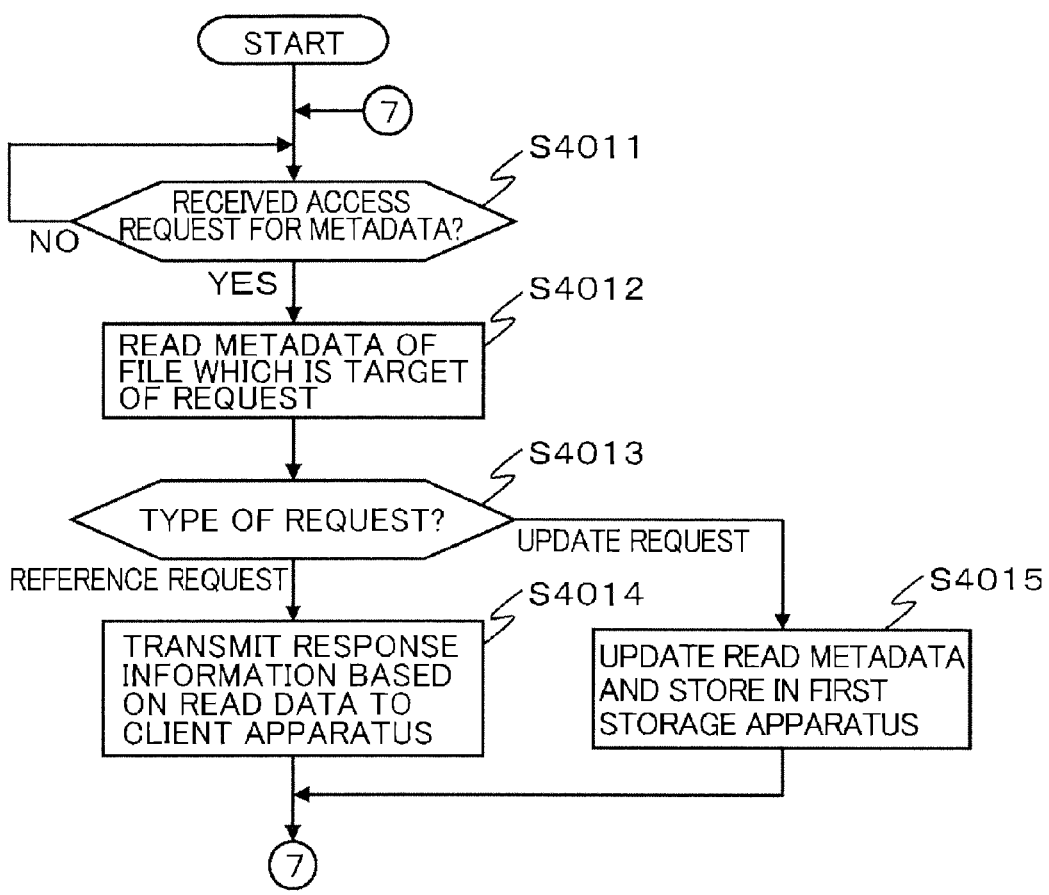
FIG. 33 is a flowchart for explaining metadata access processing S3900.

Next, the processing performed in the information processing system 1 in a case the file system 312 of the first server apparatus 3a receives an access request (a reference request or an update request) for the metadata of a stubbed file (a file whose stubbing flag 2611 is set to "1", which is also referred to as a stubbed file) from the client device 2 and the like (hereinafter also referred to as metadata access processing S3900) is shown in FIG. 32. Furthermore, a flowchart for explaining the details of the metadata access processing S3900 is shown in FIG. 33. The metadata access processing S3900 is explained with reference to these figures.

The first server apparatus 3a monitors whether or not an access request (a reference request or an update request) for the metadata of a stubbed file is received from the client device 2 (S4011). When receiving the access request for the metadata of a stubbed file (S3911, S4011: YES), the first server apparatus 3a acquires the metadata of the first storage apparatus 10a which is the target of the received access request (S4012) and, in accordance with the received access request (S4013), refers to the metadata (transmission of response information based on the read metadata to the client device 2) (S4014) or the update of the metadata (S3912, S4015). It should be noted that the first server apparatus 3a sets the metadata synchronization necessity flag 2612 of the file to "1" (S3913) when the first server apparatus 3a has updated the contents of the metadata (S4015).

As explained above, when an access request for a stubbed file occurs and when the target of the access request is only the metadata of the file, the first server apparatus 3a processes the access request by using the metadata stored in the first storage apparatus 10a. Therefore, when the target of the access request is only the metadata of the file, the first server apparatus 3a can respond to the client device 2 immediately.

<Stubbed File Entity Reference Processing>

Figure 34:
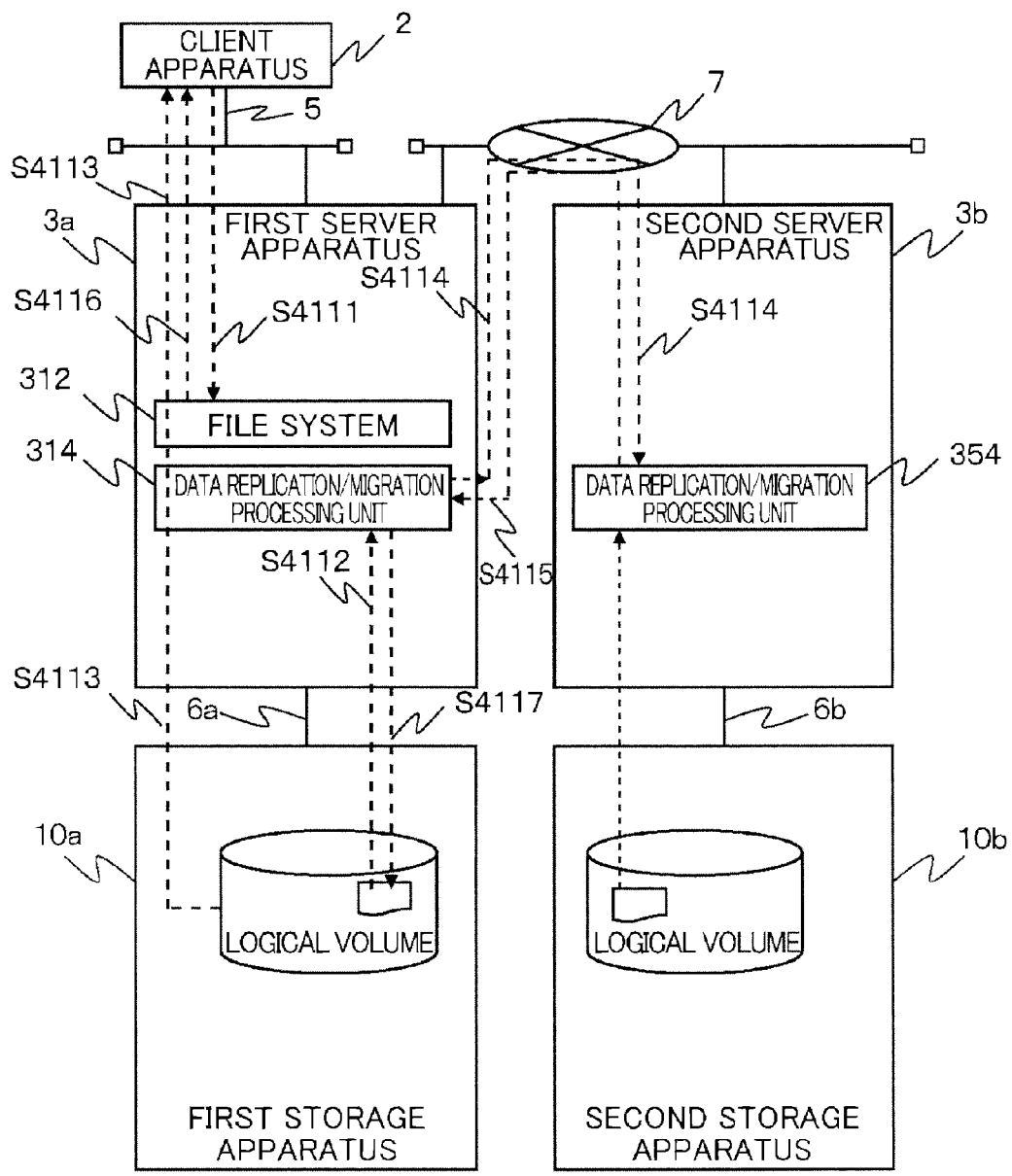
FIG. 34 is a diagram for explaining stubbed file entity reference processing S4100.
Figure 35:
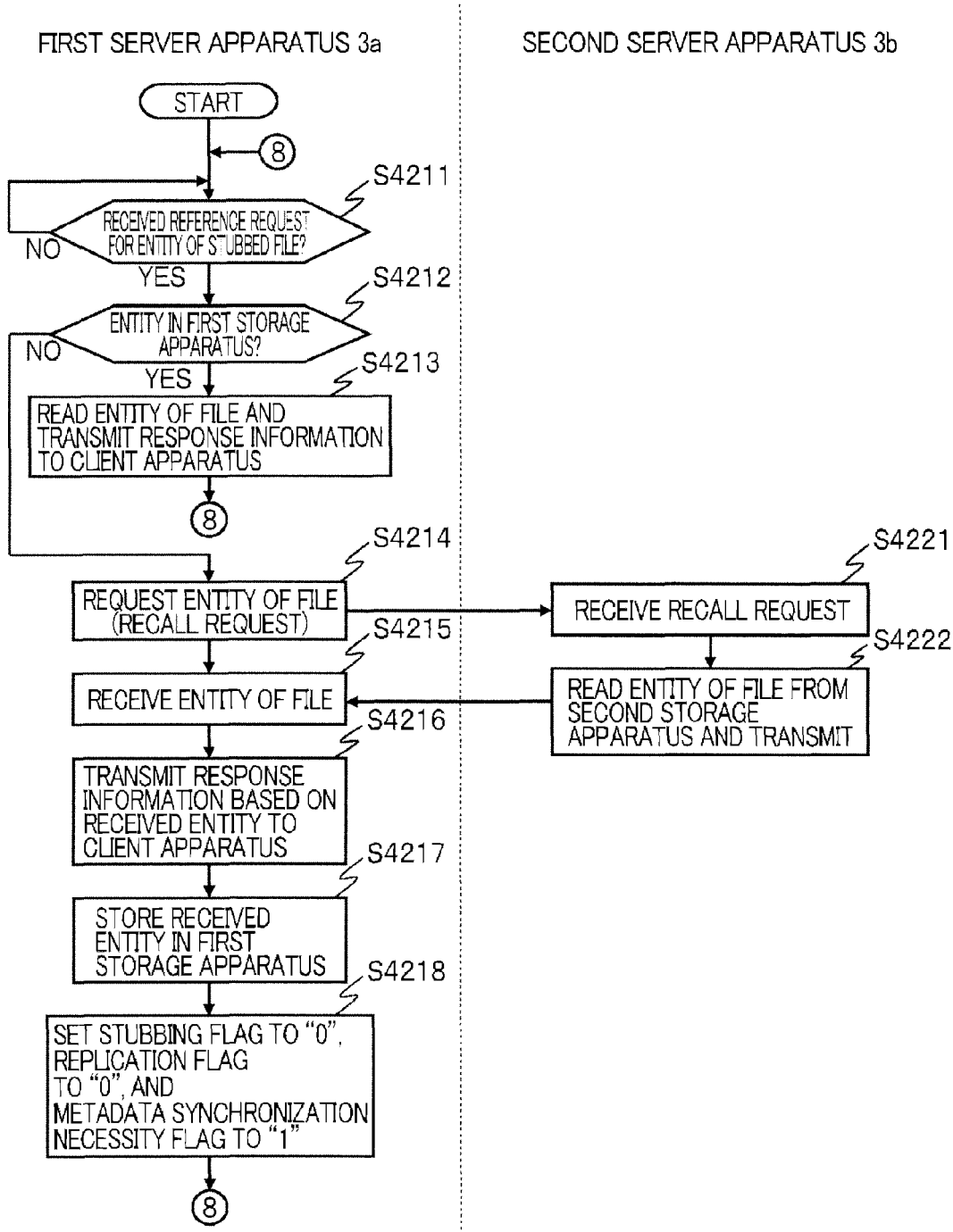
FIG. 35 is a flowchart for explaining stubbed file entity reference processing S4100.

Next, processing performed in the information processing system 1 in a case the first server apparatus 3a receives a reference request for the entity of a stubbed file from the client device 2 (hereinafter also referred to as stubbed file entity reference processing S4100) is shown in FIG. 34. Furthermore, a flowchart for explaining the details of the stubbed file entity reference processing S4100 is shown in FIG. 35. Hereinafter, the stubbed file entity reference processing S4100 is explained with reference to these figures.

When receiving a reference request for the entity of a stubbed file from the client device 2 (S4111, S4211: YES), the first server apparatus 3a determines whether or not the entity of the relevant stubbed file is stored in the first storage apparatus 10a (S4112, S4212). This determination is performed, for example, based on whether or not a valid value is set for the information (for example, the block address 2618) indicating the storage destination of the entity of the stubbed file in the acquired metadata.

When the entity of the stubbed file is stored in the first storage apparatus 10*a* (S4212:YES), the first server apparatus 3*a* reads the entity of the relevant stubbed file from the first storage apparatus 10*a*, generates information to respond to the client device 2 based on the read entity, and transmits the generated response information to the client device 2 (S4113, S4213).

Meanwhile, when the entity of the stubbed file is not stored in the first storage apparatus 10*a* (S4212: NO), the first server apparatus 3*a* requests for the entity of the stubbed file to the second server apparatus 3*b* (hereinafter also referred to as a recall request) (S4114, S4214). It should be noted that the acquisition request for the entity need not be a single request acquiring the entire entity and, for example, only a part of the entity may be requested a plurality of times.

When receiving the entity of the stubbed file transmitted in response to the above-mentioned acquisition request from the second server apparatus 3*b* (S4221, S4222, S4215, S4115), the first server apparatus 3*a* generates response information based on the received entity and transmits the generated response information to the client device 2 (S4116, S4216).

Furthermore, the first server apparatus 3*a* stores in the first storage apparatus 10*a* the entity received from the above-mentioned second server apparatus 3*b*, and sets the contents indicating the storage destination in the first storage apparatus 10*a* of the relevant file for the information indicating the storage destination of the entity of the relevant file of the metadata of the relevant stubbed file (for example, the block address 2618) (S4217).

Furthermore, the first server apparatus 3*a* sets the stubbing flag 2611 of the relevant file to "0", the replication flag 2614 to "0", and the metadata synchronization necessity flag 2612 to "1" respectively (S4117, S4218).

It should be noted that "1" is set for the metadata synchronization necessity flag 2612 for automatically synchronizing, in an ex post facto manner, the contents of the stubbing flag 2611 and the replication flag 2614 of the relevant stubbed file between the first storage apparatus 10*a* and the second storage apparatus 10*b*.

<Stubbed File Entity Update Processing>

Figure 36:
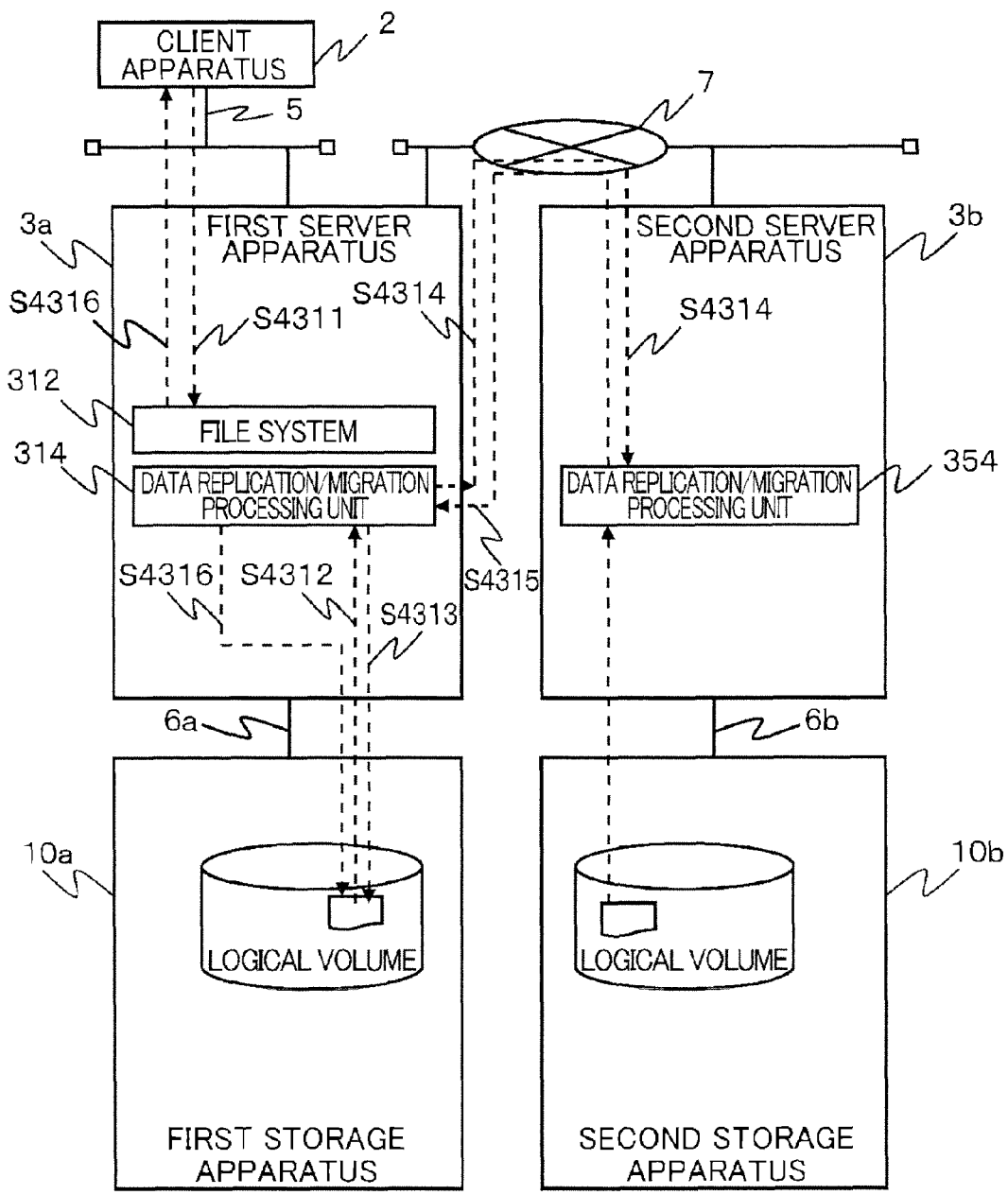
FIG. 36 is a diagram for explaining stubbed file entity update processing S4300.
Figure 37:
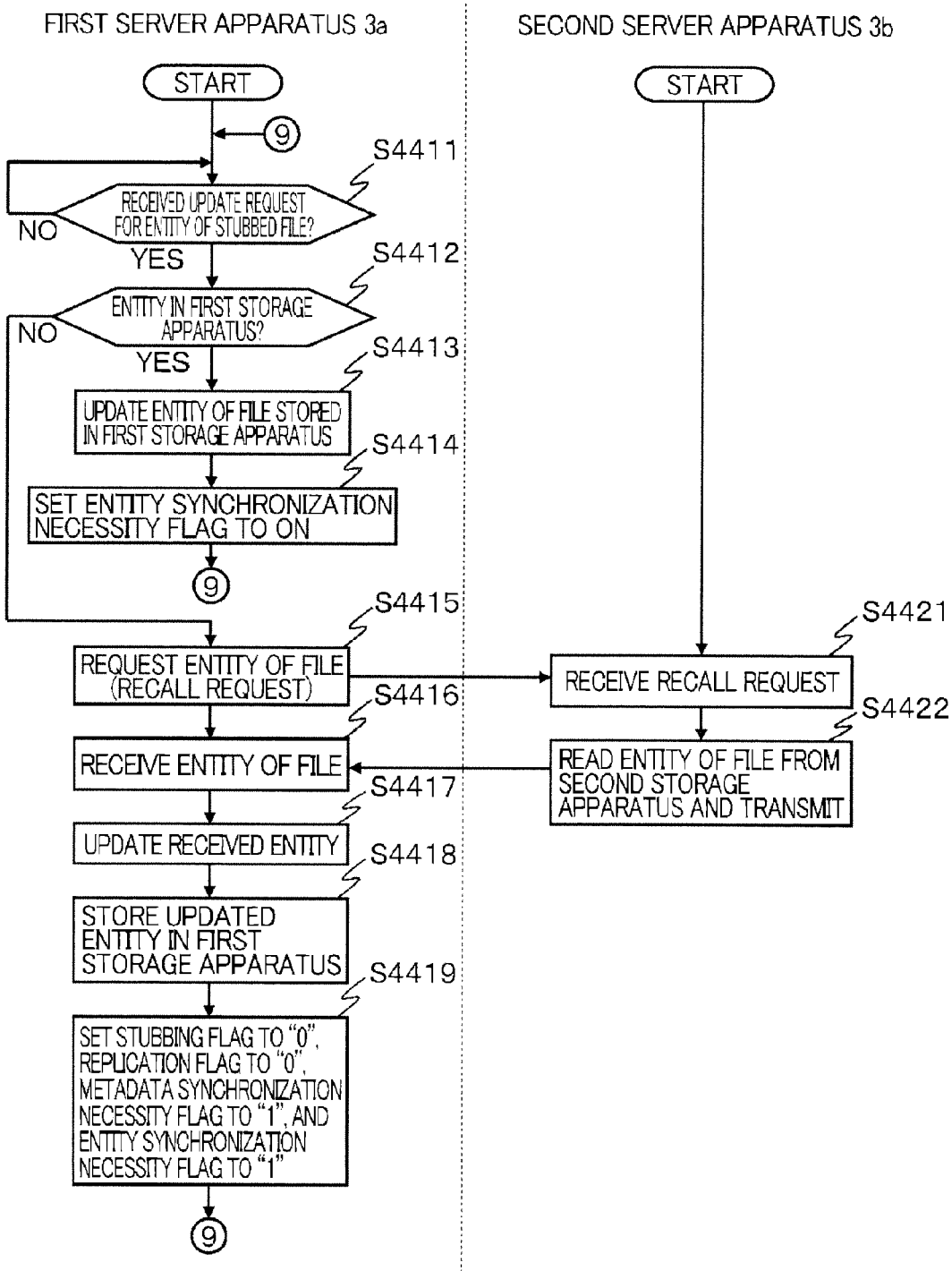
FIG. 37 is a flowchart for explaining stubbed file entity update processing S4300.

Next, processing performed in the information processing system 1 in a case the first server apparatus 3*a* accepts an update request for the entity of a stubbed file from the client device 2 (hereinafter also referred to as stubbed file entity update processing S4300) is shown in FIG. 36. Furthermore, the flowchart for explaining the details of the stubbed file entity update processing S4300 is shown in FIG. 37. Hereinafter, the stubbed file entity update processing S4300 is explained with reference to these figures.

When receiving an update request for the entity of a stubbed file from the client device 2 (S4311, S4411:YES), the first server apparatus 3*a* determines whether or not the entity of the relevant stubbed file is stored in the first storage apparatus 10*a* (S4312, S4412). It should be noted that the determination method is the same as in the case of the stubbed file entity reference processing S4100.

When the entity of the stubbed file is stored in the first storage apparatus 10*a* (S4412:YES), the first server apparatus 3*a* updates the entity of the relevant stubbed file stored in the first storage apparatus 10*a* in accordance with the contents of the update request (S4413), and also sets the entity synchronization necessity flag 2613 of the relevant stubbed file to "1" (S4313, S4414).

Meanwhile, as a result of the above-mentioned determination, when the entity of the stubbed file is not stored in the first storage apparatus 10*a* (S4412: NO), the first server apparatus 3*a* transmits an acquisition request for the entity of the relevant stubbed file (a recall request) to the second server apparatus 3*b* (S4314, S4415).

When receiving the entity of the file transmitted from the second server apparatus 3*b* in accordance with the above-mentioned request (S4315, S4421, S4422, S4416), the first server apparatus 3*a* updates the contents of the received entity in accordance with the contents of the update request (S4417), and stores the updated entity as the entity of the relevant stubbed file in the first storage apparatus 10*a* (S4316, S4418).

Furthermore, the first server apparatus 3*a* sets the stubbing flag 2611 of the relevant stubbed file to "0", the replication flag 2614 to "0", the metadata synchronization necessity flag 2612 to "1", and the entity synchronization necessity flag to "1" respectively (S4419).

<Migration Determination Processing>

Figure 38:
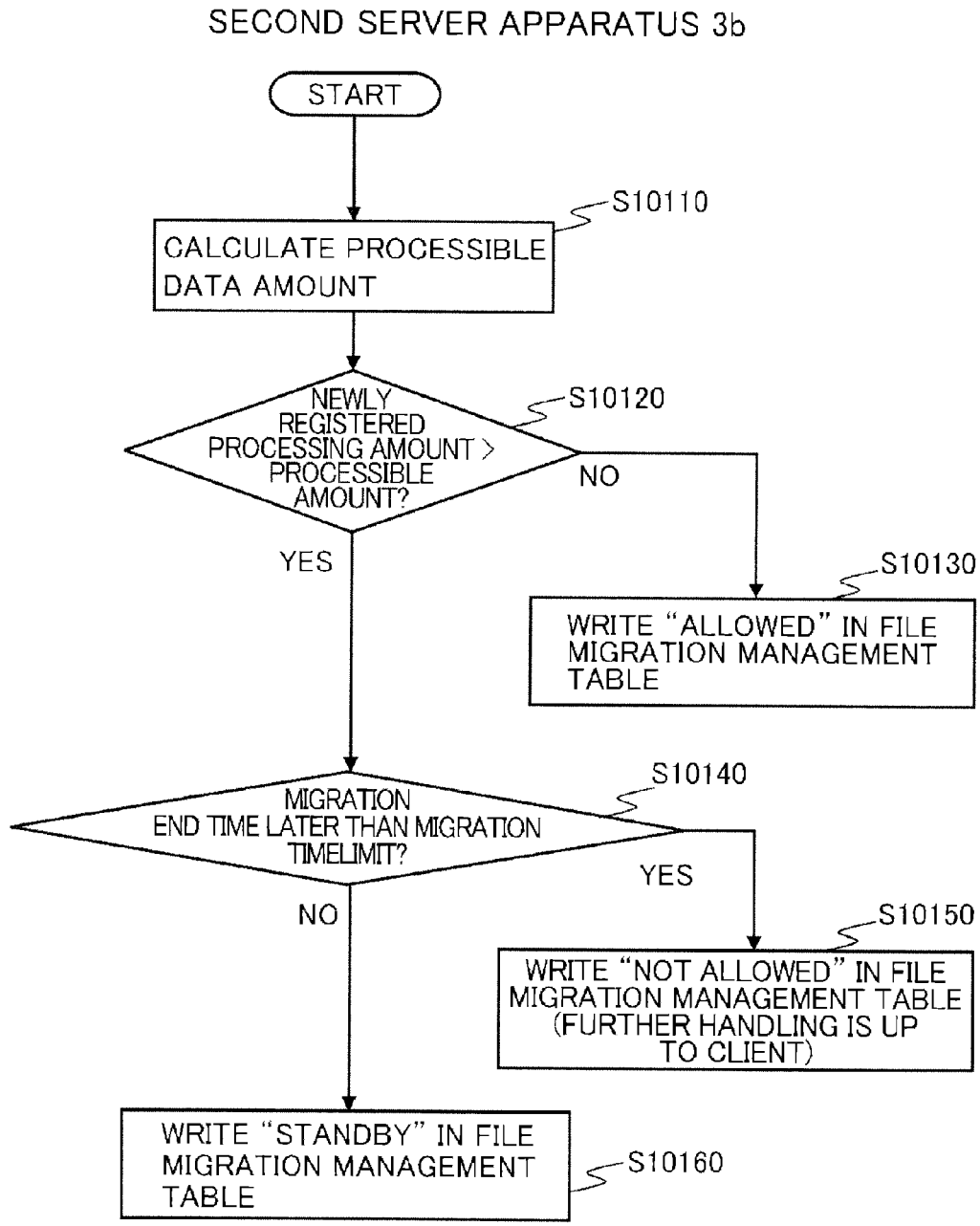
FIG. 38 is a flowchart for explaining migration determination processing S10030.

Next, the migration determination processing (S10030 in FIG. 25) performed by the second server apparatus 3*b* is explained with reference to FIG. 38. The migration determination processing is processing for determining whether migration can be performed or not when the second server apparatus 3*b* detects that file migration information is newly registered in the file migration management table 110, based on the registered file migration information and the load and the processing ability of the second storage apparatus 10*b* at that point of time.

Firstly, the second server apparatus 3*b* calculates the processible data amount of the second storage apparatus 10*b* at the current point of time (S10110). The processible data amount of the second storage apparatus 10*b* can be ascertained, for example, from the difference between the upper limit value (processing ability) for example, of the processible data amount which is set for the second storage apparatus 10*b* in advance, and the current load on the second storage apparatus 10*b* (the load due to migration which is currently under process). The current load can be acquired from the load acquisition unit 347.

For example, when the processing ability of the second storage apparatus 10*b* (for example, the upper limit value of the processible data amount) is five gigabytes per second and when one gigabyte of data per second is currently being migrated from another first storage system 8*a*, the processible data amount can be calculated as four gigabytes per second.

Next, the second server apparatus 3*b* refers to the file migration management table 110, and compares the load on the second storage apparatus 10*b* (the increment of the load) which increases when the migration registered in the file migration management table 110 as mentioned above is performed with the calculated processible data amount mentioned above (S10120).

When the load on the second storage apparatus 10*b* which increases when the migration is performed does not exceed the processible data amount, the process proceeds to No and, corresponding to the above-mentioned registered file migration information, enters "ALLOWED" indicating that the migration can be performed (S10130).

Meanwhile, when the load on the second storage apparatus 10*b* which increases when the above-mentioned migration is performed exceeds the processible data amount, the process proceeds to Yes. Subsequently, the second server apparatus 3*b* refers to the "WINDOW" field in the file migration information and confirms by what time the migration must be completed (time limit for migration).

Furthermore, the second server apparatus 3b estimates the time required for the migration based on the total data amount written in the "TOTAL TRANSFER AMOUNT" field and the transfer rate information written in the "EFFECTIVE PERFORMANCE" field in the file migration information. Subsequently, based on the current time and this required time, the second server apparatus 3b ascertains the end time of the migration (migration completion time). Subsequently, the second server apparatus 3b determines whether the migration can be completed by the time limit for migration or not (S10140).

As a result, if the migration cannot be completed by the above-mentioned time limit for migration, the process proceeds to Yes and, corresponding to the above-mentioned registered file migration information, enters "NOT ALLOWED" indicating that migration cannot be performed (S10150).

Meanwhile, if the migration can be completed by the above-mentioned time limit for migration, the process proceeds to No and, corresponding to the above-mentioned registered file migration information, enters "STANDBY" indicating that the migration is to standby temporarily (S10160).

As explained above, the second server apparatus 3b enters the result of the determination as to whether migration can be performed or not in the "RESULT" field of the file migration management table 110. The contents of the table are shown in FIG. 19.

<Re-Evaluation Processing>

Subsequently, the second server apparatus 3b refers to the file migration management table 110 again at a specified timing, and performs re-evaluation processing for performing the above-mentioned determination for the file migration information for which migration is not performed. This re-evaluation processing is performed, for example, at a timing when the migration processing which has been already performed is completed, or after a specified period of time (for example, an hour later), and the like. This re-evaluation processing is explained with reference to the flowchart shown in FIG. 39.

Firstly, the second server apparatus 3b refers to the file migration management table 110 and determines whether or not any unprocessed recall processing is registered (S10210). The file migration information in which R is entered in the "READ/WRITE" field of the file migration management table 110 indicates that the processing is the recall processing. For example, in the example shown in FIG. 19, file migration information #6 is a recall processing.

When the recall processing is requested, the processing is preferentially processed because the entity of the file must be transmitted to the request source before the first storage system 8a being the request source detects a timeout error.

If recall processing is registered in the file migration management table 110, the process proceeds to Yes and enters "ALLOWED" in the "RESULT" field of the file migration information indicating the recall processing (S10220). In this way, recall processing is performed immediately.

Meanwhile, if no unprocessed recall processing is registered in the file migration management table 110, the process proceeds to No and selects file migration information for which "STANDBY" is determined from the file migration management table 110 (S10230). For example, the second server apparatus 3b refers to the "REMAINING CACHE" field in the file migration management table 110 and selects the file migration information with the smallest remaining storage capacity from the file migration information for which "STANDBY" is determined.

Subsequently, the second server apparatus 3b calculates the current processible data amount of the second storage apparatus 10b (S10240). The second server apparatus 3b compares the load on the second storage apparatus 10b which increases when the migration by the selected file migration information mentioned above is performed with the calculated processible data amount mentioned above (S10250).

If the load on the second storage apparatus 10b which increases when the migration is performed does not exceed the processible data amount, the process proceeds to No and, corresponding to the above-mentioned selected file migration information, enters "ALLOWED" indicating that the migration can be performed (S10260).

If the load on the second storage apparatus 10b which increases when the migration is performed exceeds the processible data amount, the process proceeds to Yes, selects the next candidate from the other file migration information which is registered in the file migration management table 110 and for which "STANDBY" is determined (S10270).

The next candidate can be, for example, a file migration information whose remaining storage capacity is the second smallest. Or, the migration completion time for each migration may be ascertained based on each file migration information and set as the next candidate the file migration information whose time length from migration completion time until the time limit for migration written in the "WINDOW" field of the file migration management table 110, is the shortest.

Since it can be considered that the first storage apparatus 10a with a small remaining storage capacity is more likely to run out of storage area first, by the first storage apparatus 10a with a smaller remaining storage capacity being set to be preferentially selected as the candidate for migration, migration of the file stored in the first storage apparatus 10a which is more likely to run out of storage area can be preferentially performed. Therefore, the reliability of the information processing system 1 can be further improved.

Or, by preferentially setting as the candidate for migration the file migration information with a shorter time length from migration completion time until the time limit for migration, the number of migrations suspended can be reduced. Therefore, more files can be migrated to the second storage apparatus 10b in the information processing system 1, so that the reliability of the information processing system 1 can be further improved.

Figure 39:
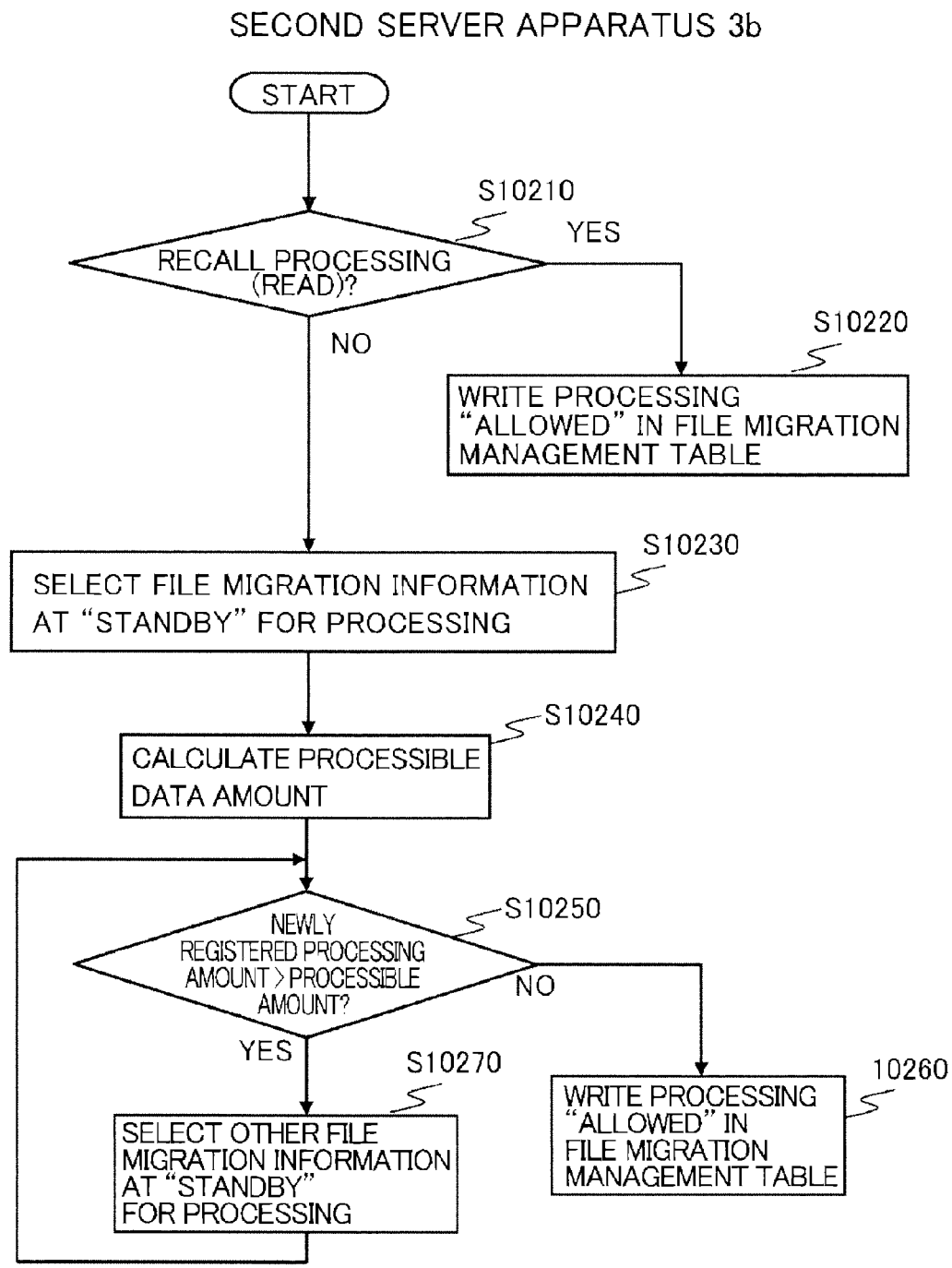
FIG. 39 is a flowchart for explaining re-evaluation processing for migration waiting to be processed.

It should be noted that in the flowchart shown in FIG. 39 recall processing is performed at steps S10210 and S10220 after confirming whether any unprocessed recall processing is registered or not. However, processing at steps S10210 and S10220 becomes unnecessary, for example, when a communication band for the recall processing between the first storage system 8a and the second storage system 8b is secured and recall processing is performed preferentially by using this communication band for recall processing. In this way, recall processing can be performed without delay.

<Processing in Case Migration Cannot be Performed>

Next, processing in a case it is determined, as a result of the migration determination processing (S10030 in FIG. 25), that migration cannot be performed is explained with reference to FIGS. 40 to 42.

Figure 40:
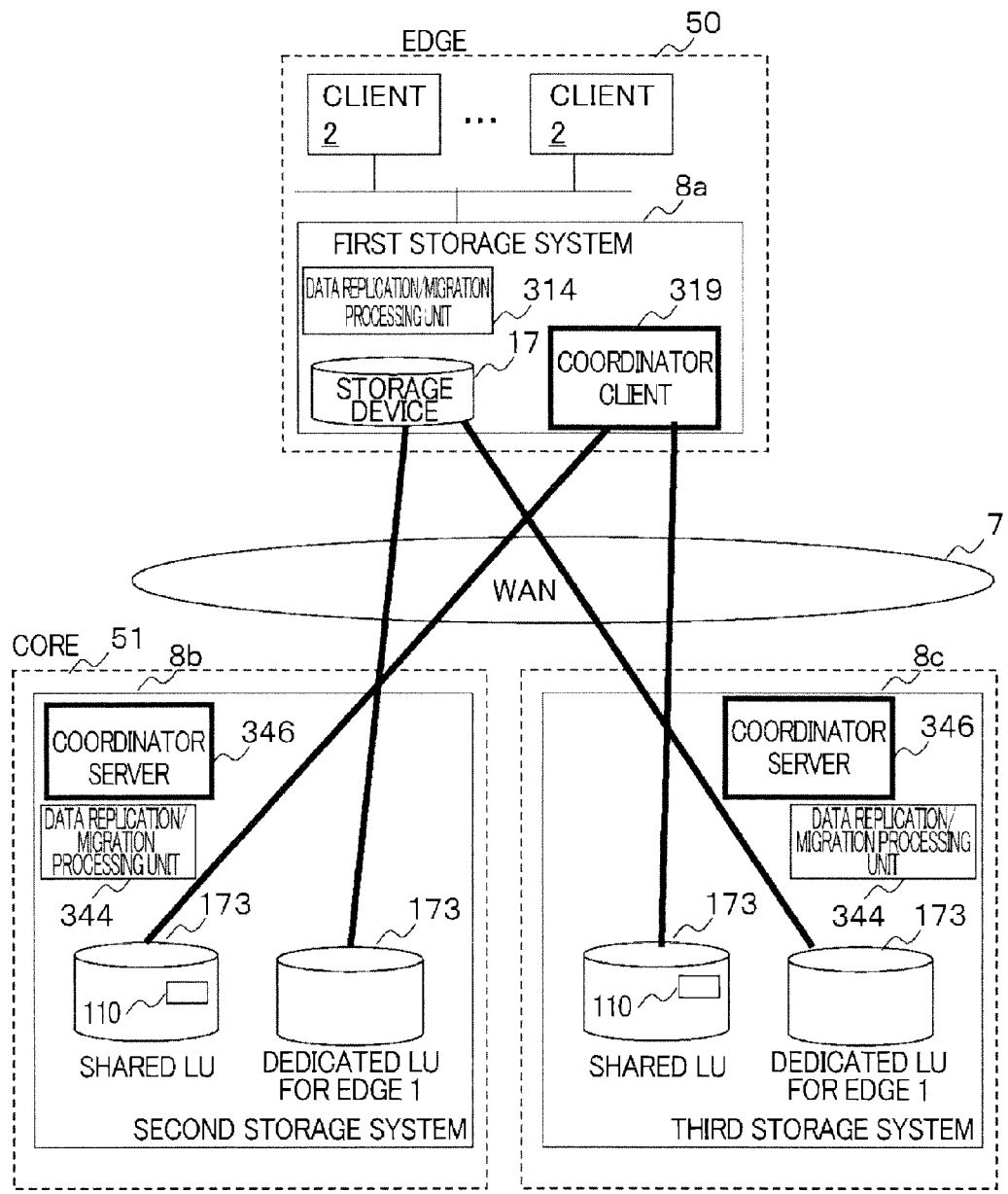
FIG. 40 is a diagram for explaining the processing in case the migration is determined not allowed to perform.

FIG. 40 is a diagram showing the configuration for performing processing in a case migration cannot be performed. In this case, the information processing system 1 is communicatively coupled to the third storage system 8c via the second network 7.

The third storage system 8c may be, for example, a storage system or a storage apparatus which is installed at a data center of another information processing system different from the information processing system 1, and may also be a storage system or a storage apparatus structured in another Core if a plurality of Cores 51 are set in information processing system 1.

An LU 173 exclusively assigned to each of the plurality of Edges 50 in the information processing system 1 and a shared LU 173 shared by all the Edges 50 are also configured in the third storage system 8c, and a coordinator server 346, a data replication/migration processing unit 344, and the like are also structured. And, the third storage system 8c performs the same information processing as the second storage system 8b. Furthermore, the third storage system 8c is configured to be capable of performing information processing in cooperation with the second storage system 8b.

Therefore, the first storage system 8a in the Edge 50 in the information processing system 1 is configured to be accessible to the second storage system 8b and the third storage system 8c.

Figure 41:
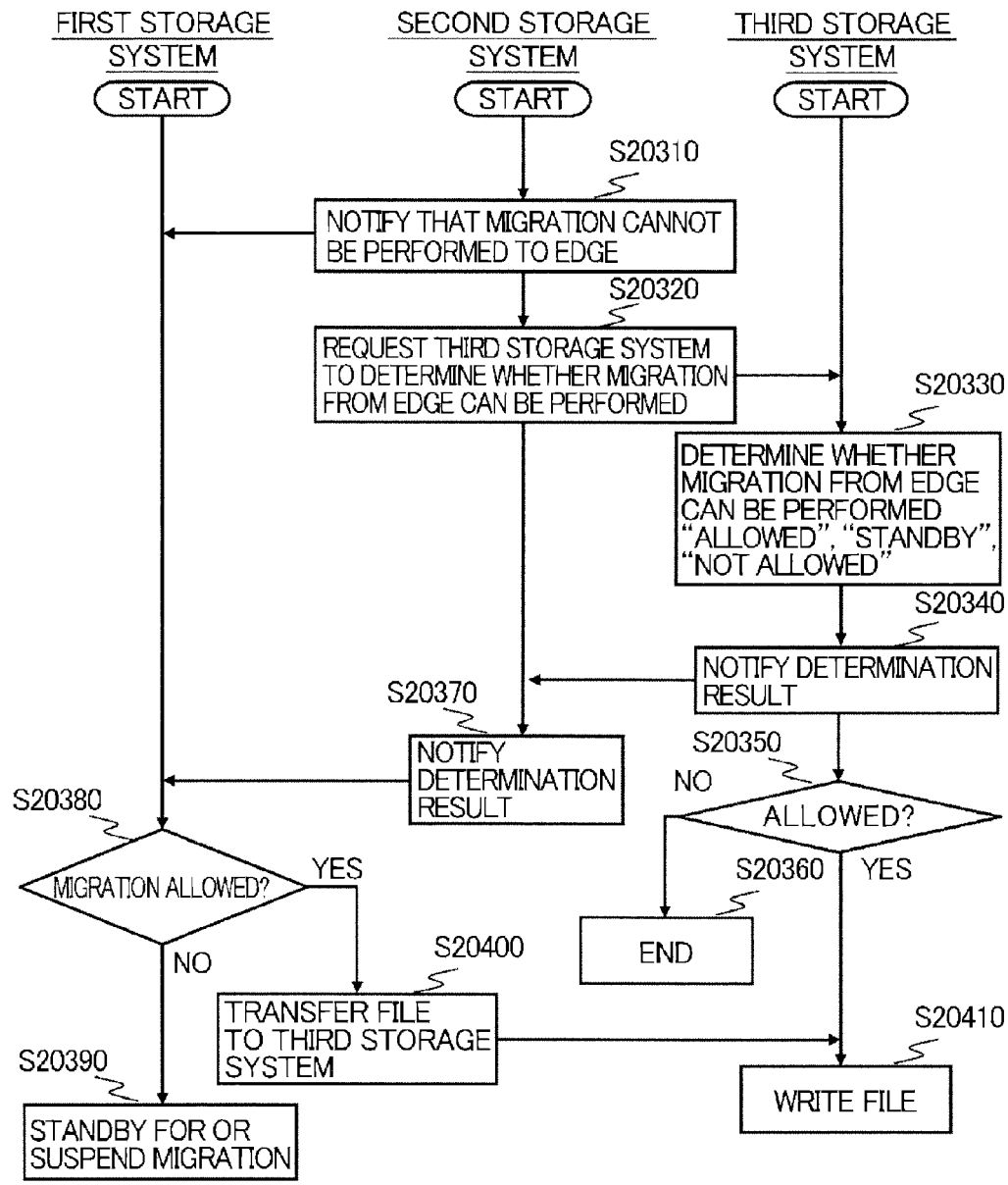
FIG. 41 is a flowchart for explaining the processing in case the migration is determined not allowed to perform.
Figure 42:
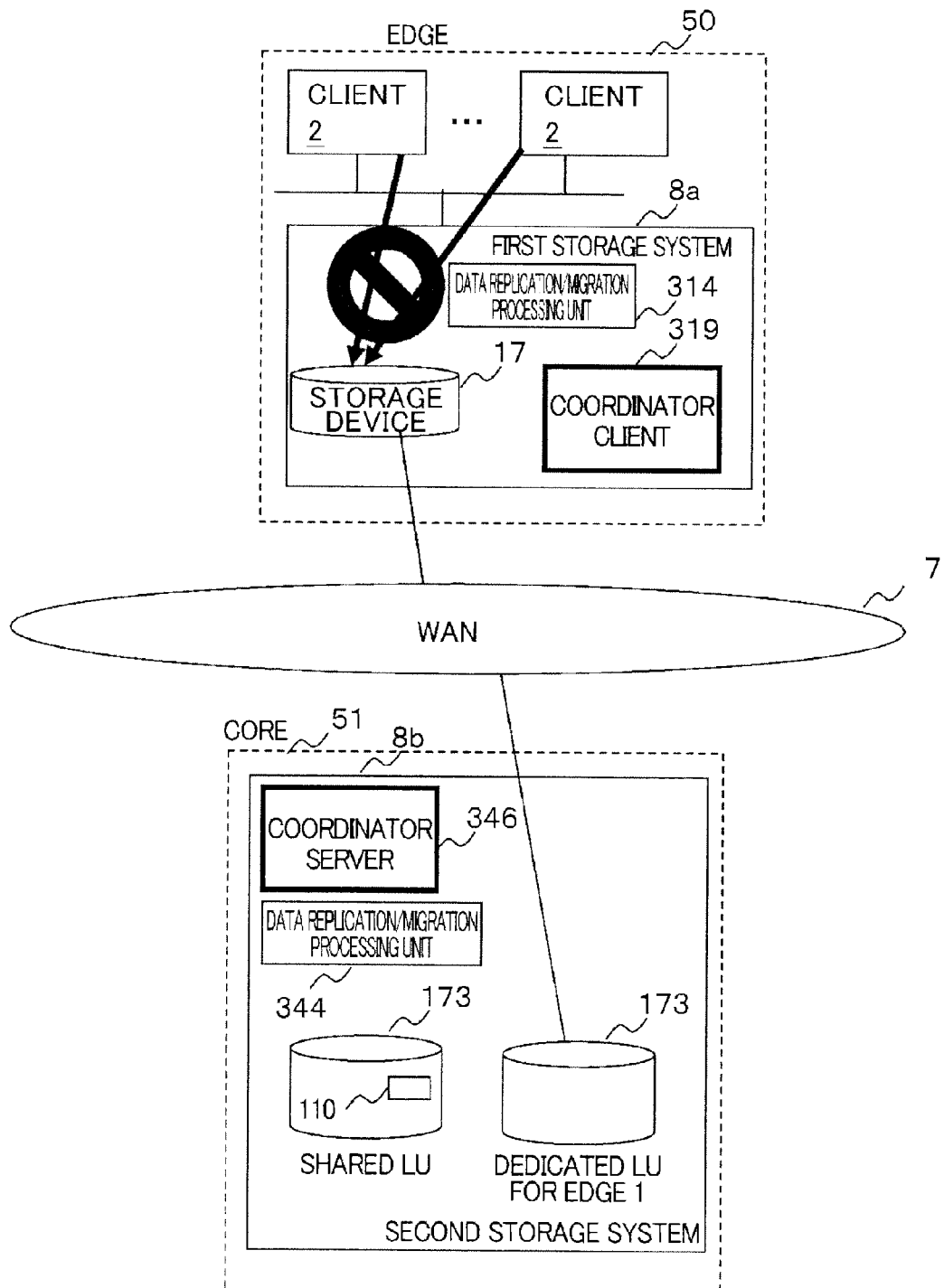
FIG. 42 is a diagram for explaining the processing in case the migration is determined not allowed to perform.

As shown in the flowchart in FIG. 41, when the second storage system 8b notifies the first storage system 8a of the determination that migration cannot be performed (S20310), the second storage system 8b requests the third storage system 8c to determine whether or not migration from the first storage system 8a can be performed or not (S20320). This request also includes file migration information from the first storage system 8a for which determination was made that migration is not allowed.

Furthermore, when acquiring the determination result that migration by the second storage system 8b cannot be performed, the first storage system 8a waits to be transmitted a determination result as to whether or not migration to the third storage system 8c can be performed.

The third storage system 8c determines whether or not migration from the first storage system 8a can be performed based on the file migration information transmitted from the second storage system 8b, and the processing ability of the third storage system 8c and the load at the point of time on the third storage system 8c (S20330). The method of this determination processing can be the same as the method of the determination processing in the above-mentioned second storage system 8b.

The third storage system 8c transmits the result of the determination to the second storage system 8b (S20340). If the migration cannot be performed (S20350), the third storage system 8c terminates the processing (S20360).

When receiving the above-mentioned determination result from the third storage system 8c, the second storage system 8b transmits the determination result to the first storage system 8a (S20370).

When the determination result is "ALLOWED" (S20380), the first storage system 8a transfers the migration target file to the third storage system 8c (S20400). Subsequently, the third storage system 8c receives the migration target file, and writes the file to the LU 173 assigned to the first storage system 8a (S20410).

It should be noted that the second storage system 8b may be made to acquire the file which the third storage system 8c received from the first storage system 8a from the third storage system 8c at such as a timing when the load falls below a specified value, and store the file in the LU 173 of the second storage system 8b.

Meanwhile, when the determination result is "STANDBY" or "NOT ALLOWED" at S20380, the first storage system 8a is at a standby for or suspends the migration (S20390).

By controlling processing in the above manner, even if the migration to the second storage system 8b cannot be performed, the first storage system 8a can perform the migration to the third storage system 8c. In this way, it becomes possible to reduce the number of migrations to be suspended. Therefore, since more files can be migrated in the information processing system 1 the reliability of the information processing system 1 can be further improved.

Furthermore, the processing in the case migration is suspended at the above-mentioned S20390 is explained with reference to FIG. 42. Specifically speaking, the processing for the case neither the migration to the second storage system 8b nor the migration to the third storage system 8c could be performed.

When file migration cannot be performed, the first storage system 8a cannot stub the file, and thus straining the storage capacity of the first storage system 8a.

Therefore, in this case, the first storage system 8a monitors the remaining storage capacity of the first storage apparatus 10a and inhibits data write from the client device 2 to the storage apparatus 10a when it is detected that the storage capacity falls below a specified value. Or, the first storage system 8a monitors the usage rate of the storage capacity of the first storage apparatus 10a and inhibits data write from the client device 2 to the storage apparatus 10a when it is detected that the usage rate exceeds a specified value (for example, 90%).

In this case, the first storage system 8a returns an error to the client device 2 when a data write request is made from the client device 2 to the first storage apparatus 10a.

It should be noted that, if the first storage system 8a cannot receive the result of the determination which is "yes" for migration even after the elapse of a predetermined amount of time after transmitting the file migration information to the second storage system 8b, the first storage system 8a can control the processing at that point of time so that data write from the client device 2 to the first storage apparatus 10a is inhibited.

In this way, for example, the overflow of the storage area of the first storage apparatus 10a can be prevented before the second storage system 8b determines that migration cannot be performed in case the used amount of the storage area of the first storage apparatus 10a increases rapidly and the like.

Or, the first storage system 8a can control the processing so that data write from the client device 2 to the first storage apparatus 10a is inhibited at the point of time when the first storage system 8a receives the result of the determination from the second storage system 8b that migration cannot be performed.

As explained above, by suspending write to the first storage apparatus 10a at an earlier stage, the prevention of the overflow of the storage area of the first storage apparatus 10a can be further ensured.

Furthermore, the first storage system 8a may also accumulate the results of determinations performed by the second storage system 8b as to whether migration can be performed or not and perform analysis processing for the results on the determinations. For example, when the rate of determinations that migration cannot be performed is higher than a specified value, the first storage system 8a may notify an alert message to the system administrator.

Or, the first storage system 8a can classify the results of the determinations as to whether migration can be performed or not, for example, in more detail, into days of the week, months, data size of migration, and the like and notify the result of the analysis to the system administrator.

In this way, information used for reviewing and determining the contents of the file migration information policy can be provided to the system administrator.

Although the embodiments of the present invention have been explained above, the embodiments above are intended for facilitating the understanding the present invention and not for limiting the interpretation of the present invention to the embodiments above. The present invention can be modified or improved without departing form the gist thereof, and equivalents thereof are also encompassed by the present invention.

The invention claimed is:

1. An information processing system comprising:
a plurality of first storage apparatuses configured to receive data I/O requests in file units sent from an information processing apparatus, and perform data I/O; and
a second storage apparatus that is communicatively coupled to each of the plurality of first storage apparatuses,
wherein:
one of the plurality of first storage apparatuses, prior to a file migration to the second storage apparatus, is configured to notify the second storage apparatus of file migration information being information relating to the file migration,
the second storage apparatus is configured to calculate an increment of a load on the second storage apparatus that is generated by the file migration based on information written in the file migration information,
the second storage apparatus is configured to determine whether the file migration is allowable based on a current load on the second storage apparatus itself and the increment,
the second storage apparatus is configured to notify the determination result to the one of the plurality of first storage apparatuses that has notified the file migration information,
the one of the plurality of first storage apparatuses is configured to determine whether to migrate the file to the second storage apparatus based on the determination result,
the second storage apparatus is configured to determine that the file migration from the one of the plurality of first storage apparatuses is to be at hold, in a case a sum of the increment and a current load on the second storage apparatus itself is greater than a predetermined value,
the second storage apparatus, at a predetermined timing, is configured to redetermine based on the file migration information whether the file migration determined to be at hold is allowable,
the file migration information has written therein information indicating a usage rate of a storage area in the one of the plurality of first storage apparatuses, and
the second storage apparatus, when redetermining whether to perform the file migration, is configured to refer to information indicating a usage rate of the storage area written in each file migration information, and to redetermine, in descending order of the usage rate, file migration information notified from the first storage apparatuses, when file migration is determined to be at hold for another of the first storage apparatuses.

2. The information processing system according to claim 1, wherein
the second storage apparatus includes a file migration management table capable of being read and written from the plurality of first storage apparatuses,
the one of the plurality of first storage apparatuses, prior to migration of a file to the second storage apparatus, is configured to notify the second storage apparatus of the file migration information by writing the file migration information in the file migration management table, and the second storage apparatus is configured to notify the one of the plurality of first storage apparatuses of the determination result by writing the determination result in the file migration management table in correspondence with the file migration information.

3. The information processing system according to claim 1, wherein
the second storage apparatus is configured to determine that the file migration from the one of the plurality of first storage apparatuses is allowable, in a case a sum of the increment and current load on the second storage apparatus itself is equal to or less than a predetermined value.

4. The information processing system according to claim 3, wherein
the one of the plurality of first storage apparatuses determined allowable to perform the file migration, is configured to send a replica of the file to the second storage apparatus, to acquire from the second storage apparatus storage location of the replica of the file in the second storage apparatus, and to store the acquired storage location in the one of the plurality of first storage apparatuses as well as to delete the file from the one of the plurality of first storage apparatuses.

5. An information processing system comprising:
a plurality of first storage apparatuses configured to receive data I/O requests in file units sent from an information processing apparatus, and perform data I/O; and
a second storage apparatus that is communicatively coupled to each of the plurality of first storage apparatuses,
wherein:
one of the plurality of first storage apparatuses, prior to a file migration to the second storage apparatus, is configured to notify the second storage apparatus of file migration information being information relating to the file migration,
the second storage apparatus is configured to calculate an increment of a load on the second storage apparatus that is generated by the file migration based on information written in the file migration information,
the second storage apparatus is configured to determine whether the file migration is allowable based on a current load on the second storage apparatus itself and the increment,
the second storage apparatus is configured to notify the determination result to the one of the plurality of first storage apparatuses that has notified the file migration information,
the one of the plurality of first storage apparatuses is configured to determine whether to migrate the file to the second storage apparatus based on the determination result,
the second storage apparatus is configured to determine that the file migration from the one of the plurality of first storage apparatuses is to be at hold, in a case a sum of the increment and a current load on the second storage apparatus itself is greater than a predetermined value,
the second storage apparatus. at a predetermined timing, is configured to redetermine based on the file migration information whether the file migration determined to be at hold is allowable,
the file migration information has written therein information indicating a data amount of a file to be migrated, time limit for migration, and data transfer rate at migration, and
the second storage apparatus, when redetermining whether to perform the file migration, is configured to ascertain transfer completion time for each file, based on data amount, data transfer rate at migration and current time written in each file migration information when file migration is determined to be at hold for another of the first storage apparatuses, and the second storage apparatus is configured to redetermine file migration information in ascending order of length of time from migration completion time until migration time limit.

6. The information processing system according to claim 5, wherein the second storage apparatus is configured to determine that the file migration from the one of the plurality of first storage apparatuses is not allowed when the file migration cannot be completed by the migration time limit.

7. The information processing system according to claim 6, wherein each of the plurality of first storage apparatuses are communicatively coupled to a third storage apparatus, and the one of the plurality of first storage apparatuses that was determined that the file migration is not allowed, is configured to migrate the file to the third storage apparatus.

8. The information processing system according to claim 6 wherein the one of the plurality of first storage apparatuses that was determined that the file migration is not allowed, is configured to prevent the information processing apparatus from writing a file in the one of the plurality of first storage apparatuses.

9. The information processing system according to claim 5, wherein the second storage apparatus includes a file migration management table capable of being read and written from the plurality of first storage apparatuses, the one of the plurality of first storage apparatuses, prior to migration of a file to the second storage apparatus, is configured to notify the second storage apparatus of the file migration information by writing the file migration information in the file migration management table, and the second storage apparatus is configured to notify the one of the plurality of first storage apparatuses of the determination result by writing the determination result in the file migration management table in correspondence with the file migration information.

10. The information processing system according to claim 5, wherein the second storage apparatus is configured to determine that the file migration from the one of the plurality of first storage apparatuses is allowable, in a case a sum of the increment and current load on the second storage apparatus itself is equal to or less than a predetermined value.

11. The information processing system according to claim 10, wherein the one of the plurality of first storage apparatuses determined allowable to perform the file migration, is configured to send a replica of the file to the second storage apparatus, to acquire from the second storage apparatus storage location of the replica of the file in the second storage apparatus, and to store the acquired storage location in the one of the plurality of first storage apparatuses as well as to delete the file from the one of the plurality of first storage apparatuses.

12. A method for controlling an information processing system including a plurality of first storage apparatuses that receive data I/Os requests in file units sent from an information processing apparatus, and perform data I/O, and a second storage apparatus that is communicatively coupled to each of the plurality of first storage apparatuses, the method comprising:

notifying, by one of the plurality of first storage apparatuses, prior to file migration to the second storage apparatus, to the second storage apparatus of file migration information being information relating to the file migration;

calculating, by the second storage apparatus, an increment of a load on the second storage apparatus that is generated by the file migration based on information written in the file information;

determining, by the second storage apparatus, whether the file migration is allowable based on a current load on the second storage apparatus itself and the increment;

notifying, by the second storage apparatus, the determination result to the one of the plurality of first storage apparatuses that has notified the file migration information;

determining, by the one of the plurality of first storage apparatuses, whether to migrate the file to the second storage apparatus based on the determination result;

determining, by the second storage apparatus, that the file migration from the one of the plurality of first storage apparatuses is to be at hold, in a case a sum of the increment and a current load on the second storage apparatus itself is greater than a predetermined value;

redetermining, by the second storage apparatus at a predetermined timing, whether the file migration determined to be at hold is allowable based on the file migration information;

referring, by the second storage apparatus when redetermining whether to perform the file migration, to information indicating a usage rate of the storage area written in each file migration information, wherein the file migration information has written therein information indicating a usage rate of a storage area in the one of the plurality of first storage apparatuses; and redetermining, by the second storage apparatus, in descending order of the usage rate, file migration information notified from the first storage apparatuses, when file migration is determined to be at hold for another of the first storage apparatuses.

* * * * *